(12) United States Patent
Hwang et al.

(10) Patent No.: US 8,045,583 B2
(45) Date of Patent: *Oct. 25, 2011

(54) COMMUNICATION CONDITION INFORMATION IN A MOBILE TERMINAL AND NETWORK OF A WIRELESS COMMUNICATION SYSTEM

(75) Inventors: In Tae Hwang, Kyungki-do (KR); Chong Yeop Park, Seoul (KR)

(73) Assignee: LG Electronics Inc., Seoul (KR)

( * ) Notice: Subject to any disclaimer, the term of this patent is extended or adjusted under 35 U.S.C. 154(b) by 100 days.

This patent is subject to a terminal disclaimer.

(21) Appl. No.: 11/849,056

(22) Filed: Aug. 31, 2007

(65) Prior Publication Data

US 2007/0291651 A1   Dec. 20, 2007

Related U.S. Application Data

(63) Continuation of application No. 11/357,944, filed on Feb. 22, 2006, now abandoned, which is a continuation of application No. 09/234,518, filed on Jan. 21, 1999, now Pat. No. 7,123,628.

(30) Foreign Application Priority Data

May 6, 1998  (KR) .................................... 98-16196
May 7, 1998  (KR) .................................... 98-16345
May 9, 1998  (KR) .................................... 98-16636

(51) Int. Cl.
*H04J 3/16* (2006.01)
*H04W 4/00* (2009.01)

(52) U.S. Cl. ......... 370/469; 370/252; 370/328; 370/331
(58) Field of Classification Search .................. 370/252, 370/310–312, 328, 329, 331, 438, 450, 469
See application file for complete search history.

(56) References Cited

U.S. PATENT DOCUMENTS 5,255,307 A   10/1993   MiziKovsky
(Continued)

FOREIGN PATENT DOCUMENTS

KR   10-1998-0013171   4/1998
(Continued)

OTHER PUBLICATIONS

Information technology—Telecommunications and Information exchange between systems—Local and Metropolitan area networks—Specific requirements—"Part 11: Wireless LAN Medium Access Control (MAC) and Physical Layer (PHY) Specifications" IEE Std 802.11 (Jun. 27, 1997).

(Continued)

*Primary Examiner* — Hassan Phillips
*Assistant Examiner* — Saba Tsegaye
(74) *Attorney, Agent, or Firm* — Lee, Hong, Degerman Kang & Waimey

(57) ABSTRACT

A communication system which has a plurality of mobile terminals and a base station, each of the mobile terminals and/or base station comprising a medium access control sub-layer, upper layers of the medium access control sub-layer, and a lower layer of the medium access control sub-layer, wherein the medium access control sub-layer is configured to perform self-basic functions in response to basic function execution requests or functions associated with the upper layers or lower layer in response to requests therefrom. According to the present invention, the communication system can provide a compatible multimedia communication service even if an originating terminal and a terminating terminal employ different communication manners, they are available from different manufacturers or they are operated by different communication service operators.

10 Claims, 23 Drawing Sheets

U.S. PATENT DOCUMENTS

| | | | |
|---|---|---|---|
| 5,353,332 A | 10/1994 | Raith et al. | |
| 5,426,637 A * | 6/1995 | Derby et al. | 370/401 |
| 5,528,247 A | 6/1996 | Nonami | |
| 5,541,927 A | 7/1996 | Kristol et al. | |
| 5,546,397 A | 8/1996 | Mahany | |
| 5,548,816 A | 8/1996 | DeVaney | |
| 5,572,221 A | 11/1996 | Marlevi et al. | |
| 5,600,644 A | 2/1997 | Chang et al. | |
| 5,634,195 A * | 5/1997 | Sawyer | 455/522 |
| 5,638,371 A | 6/1997 | Raychaudhuri et al. | |
| 5,729,541 A | 3/1998 | Hamalainen et al. | |
| 5,729,543 A | 3/1998 | Weigand et al. | |
| 5,742,588 A | 4/1998 | Thornberg et al. | |
| 5,745,523 A | 4/1998 | Dent et al. | |
| 5,790,553 A * | 8/1998 | Deaton et al. | 370/466 |
| 5,822,314 A | 10/1998 | Chater-Lea | |
| 5,839,071 A | 11/1998 | Johnson | |
| 5,907,544 A | 5/1999 | Rypinski | |
| 5,909,471 A | 6/1999 | Yun | |
| 5,915,221 A * | 6/1999 | Sawyer et al. | 455/437 |
| 5,946,634 A | 8/1999 | Korpela | |
| 5,966,657 A * | 10/1999 | Sporre | 455/425 |
| 5,974,314 A | 10/1999 | Hudson | |
| 5,974,320 A * | 10/1999 | Ward et al. | 455/437 |
| 5,982,742 A | 11/1999 | Leung et al. | |
| 6,016,430 A | 1/2000 | Shinomiya | |
| 6,044,069 A | 3/2000 | Wan | |
| 6,044,081 A | 3/2000 | Bell et al. | |
| 6,081,534 A | 6/2000 | Sipila | |
| 6,108,713 A * | 8/2000 | Sambamurthy et al. | 709/250 |
| 6,111,867 A | 8/2000 | Mann et al. | |
| 6,157,835 A | 12/2000 | Findikli et al. | |
| 6,181,947 B1 | 1/2001 | Du et al. | |
| 6,198,728 B1 | 3/2001 | Hulyalkar et al. | |
| 6,198,936 B1 | 3/2001 | Yang et al. | |
| 6,225,888 B1 | 5/2001 | Juopperi | |
| 6,275,701 B1 | 8/2001 | Cerwall | |
| 6,320,873 B1 | 11/2001 | Nevo et al. | |
| 6,334,052 B1 | 12/2001 | Nordstrand | |
| 6,351,642 B1 | 2/2002 | Corbett et al. | |
| 6,381,235 B1 | 4/2002 | Kamel et al. | |
| 6,393,008 B1 | 5/2002 | Cheng et al. | |
| 6,490,454 B1 | 12/2002 | Kangas et al. | |
| 6,519,266 B1 | 2/2003 | Manning et al. | |
| 6,532,227 B1 | 3/2003 | Leppisaari et al. | |
| 6,615,050 B1 | 9/2003 | Tiedemann et al. | |
| 6,690,929 B1 * | 2/2004 | Yeh | 455/406 |
| 7,236,787 B1 | 6/2007 | Tamura et al. | |
| 2002/0028668 A1 | 3/2002 | Grayson et al. | |
| 2002/0034166 A1 | 3/2002 | Barany et al. | |
| 2002/0089958 A1 | 7/2002 | Feder et al. | |
| 2003/0146871 A1 * | 8/2003 | Karr et al. | 342/457 |

FOREIGN PATENT DOCUMENTS

| | | |
|---|---|---|
| KR | 10-1999-022147 | 3/1999 |

OTHER PUBLICATIONS

ITU-T "Series I: Integrated Services Digital Network" Overall network aspects and functions—Protocol layer requirements; B-ISDN ATM layer specification; 1.361 (Feb. 1999).

* cited by examiner

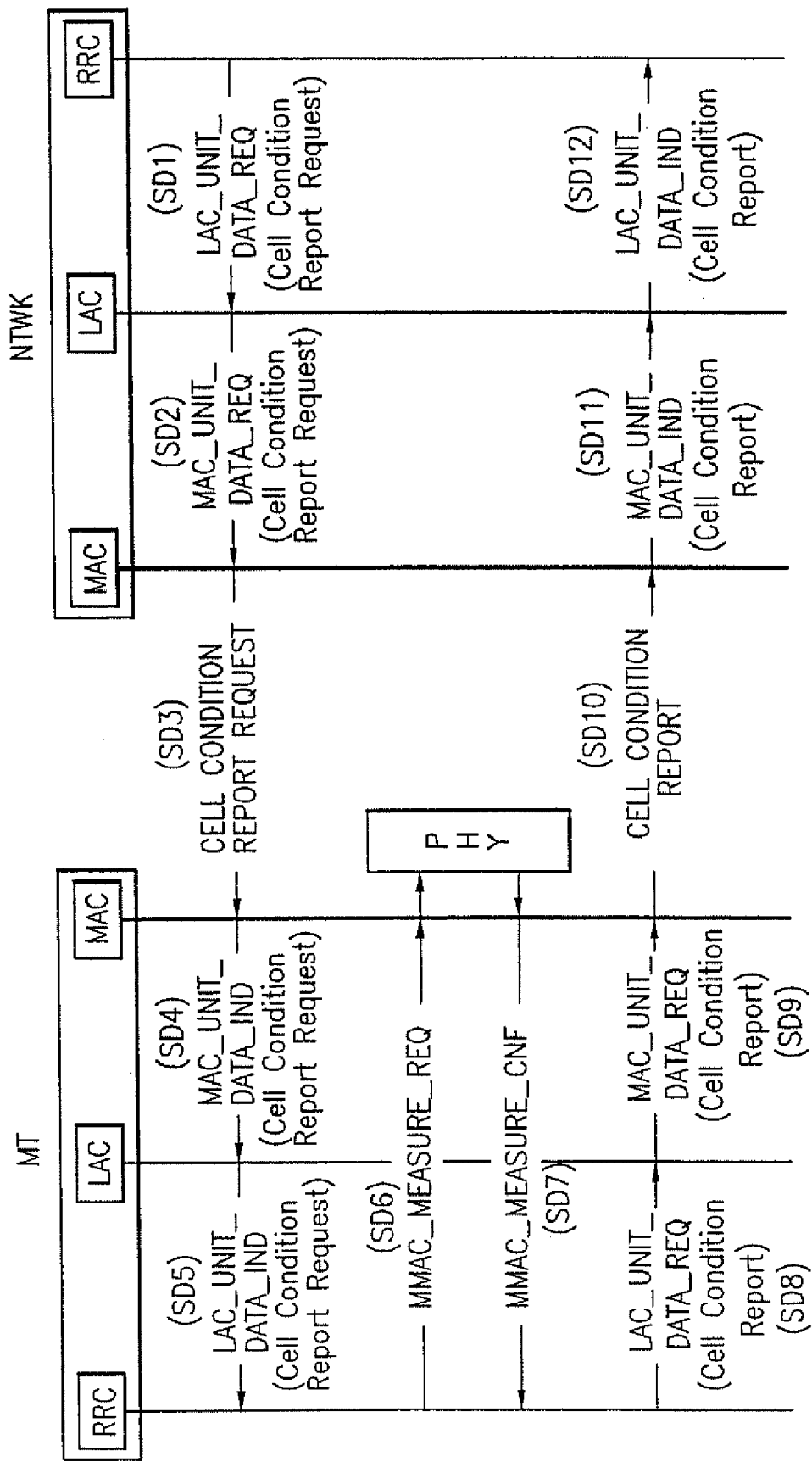

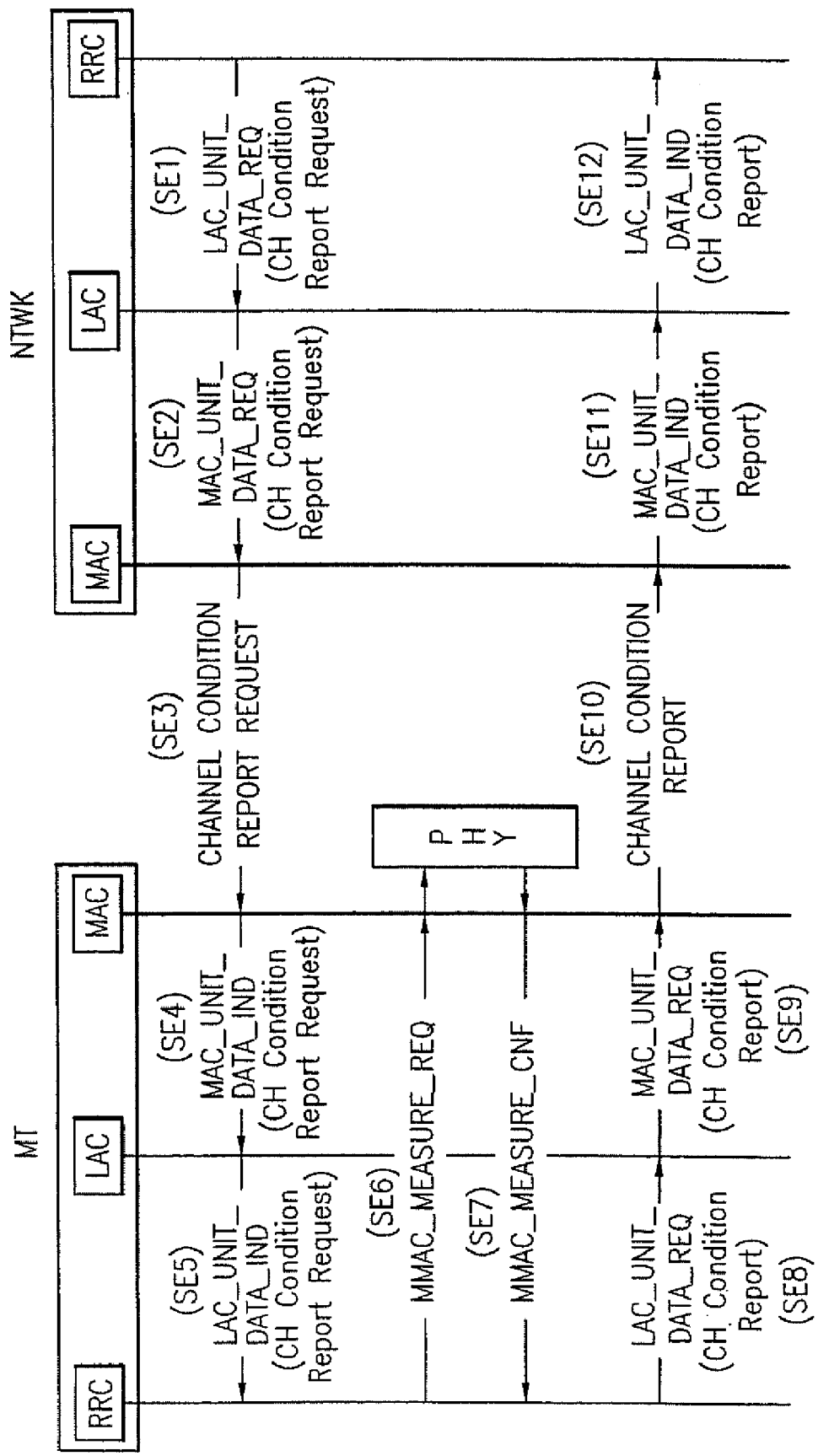

| LOGICAL CHANNEL TYPE | MESSAGE | DIRECTION | REMARK |
|---|---|---|---|
| FORWARD ACCESS CHANNEL (FACH) | CHANNEL REQUEST ACK | NTWK → MT | FRAME Format A' |
| | CHANNEL RESPONSE | NTWK → MT | FRAME Format A'B |
| REVERSE ACCESS CHANNEL (RACH) | CHANNEL REQUEST | MT → NTWK | FRAME Format A |

FIG.10

```
8 7 6 5 4 3 2 1
X X X X X - - -    FORWARD ACCESS CHANNEL ASSOCIATED MESSAGE
        0 0 1     -CHANNEL REQUEST ACK
        0 1 0     -CHANNEL RESPONSE
X X X X X - - -    REVERSE ACCESS CHANNEL ASSOCIATED MESSAGE
        0 0 0     -CHANNEL REQUEST
```

FIG.11

| INFORMATION ELEMENT OF MAC | REMARK |
|---|---|
| Establishment Cause | 3 bits |
| Random Reference | 5 bits |
| PAGING CH NUM | 4 bits |
| PAGING SLOT NUM | 4 bits |

0 0 0 X X X X X    -location updating
0 0 1 X X X X X    -answer to paging
0 1 0 X X X X X    -originating call
0 1 1 X X X X X    -call re-establishment
1 0 0 X X X X X    -emergency call
```

FIG.13

```
8 7 6 5 4 3 2 1 x x x x 0 0 0 0    -non-slot mode paging
x x x x 0 0 0 1    -paging1
x x x x 0 0 1 0    -paging2
x x x x 0 0 1 1    -paging3
x x x x 0 1 0 0    -paging4
x x x x 0 1 0 1    -paging5
x x x x 0 1 1 0    -paging6
                   ..........
x x x x 1 1 1 1    -paging15
```

COMMUNICATION CONDITION INFORMATION IN A MOBILE TERMINAL AND NETWORK OF A WIRELESS COMMUNICATION SYSTEM

CROSS-REFERENCE TO RELATED APPLICATIONS

This is a Continuation Application of prior application Ser. No. 11/357,944 filed on Feb. 22, 2006, now abandoned, which is a Continuation Application of prior application Ser. No. 09/234,518 filed on Jan. 21, 1999, now U.S. Pat. No. 7,123,628 issued on Oct. 17, 2006, whose entire disclosures are incorporated herein by reference. Further, this application claims the benefit of Korean Application Nos. 16196/1998 filed on May 6, 1998 in Korea, 16345/1998 filed on May 7, 1998 in Korea and 16636/1998 filed on May 9, 1998 in Korea, which are hereby incorporated by reference.

BACKGROUND OF THE INVENTION

1. Field of the Invention

The present invention relates in general to a communication system with medium access control (referred to hereinafter as MAC) sub-layers provided respectively in a pluraty of mobile terminals and a base station, and more particularly to a communication system suitable for the implementation of a multimedia communication service.

2. Description of the Prior Art

Recently, communication systems have very rapidly been developed in every country. Digital communication systems proposed up to now can be classified into a frequency division multiple access (FDMA) type, a time division multiple access (TDMA) type and a code division multiple access (CDMA) type according to how accesses are established between a base station and mobile terminals. Only one of the above-mentioned various access systems may selectively be used in some countries or regions. Alternatively, different access systems may simultaneously be used in other countries or regions. For example, the CDMA communication system and a global system for mobile communication (GSM) are simultaneously used in Moscow. To this end, each mobile terminal or base station (or network) is required to comprise two types of modulation/demodulation modules to compatibly control the two types of access systems. This requirement runs counter to the international communication equipment trend of lightness, thinness, smallness and compactness and becomes a primary factor of weakening the competitiveness of communication products.

On the other hand, even if a single communication system is employed in a certain region, products may be different in function according to their options and operating systems of mobile terminal manufacturers, other communication equipment manufacturers and communication service operators.

In this connection, a study is being made of increasing the compatiblty of communication equipment to provide a communication service to users using the same communication system in the same region, regardless of manufacturers and communication service operators. The representative example may be a Digital European Cordless Telecommunication (referred to hereinafter as DECT) system. This DECT system has been developed under the necessity of cordless communication capable of accepting data communication requirements to a certain degree while giving the first consideration to voice communication. Accordingly, the DECT system can establish interoperabibty among communication equipment of different manufacturers to provide the users with various communication services regarding voice and data as extended optional services, as well as basic services.

FIG. 1 shows a protocol stack used in a conventional DECT system. As shown in this drawing, the conventional DECT system is composed of a physical layer (PHY) 10, a MAC sub-layer 20, data link control layers (DLC1 and DLC2) 30 and 40 and a network layer (NWK) 50.

The PHY 10 of the DECT system functions to divide a given radio spectrum into physical channels. These divisions are made at two domains, or time and frequency. For the frequency and time divisions, a TDMA operation is performed with respect to multiple radio carriers. For example, in the conventional DECT system, ten carriers are provided at a frequency band between 1880 MHZ and 1900 MHZ.

The MAC sub-layer 20 of the DECT system basically takes charge of two main functions. The first function is to select a physical channel and set or release connection of a call on the selected physical channel. The second function is to multiplex control information together with upper layer information and error control information into a packet in the form of a slot or demultiplex the packet into such information.

The DLC1 30 and DLC2 40 act to provide reliable data links to the NWK 50. Also, the DLC1 30 and DLC2 40 are closely connected with the MAC sub-layer 20 to provide the upper layer with data integration higher than that provided single-handed by the MAC sub-layer 20. In FIG. 1, a C-plane is common to all application layers and provides very reliable transmission links for internal control signals and a limited amount of user information traffic. A U-plane is adapted to provide a variety of alternative services, which are optimized for specific requirements.

The NWK 50 of the DECT system is a main signal layer of the protocol stack. In the conventional DECT system, the NWK 50 employs a configuration similar to that in an ISDN layer 3 protocol (ETS 300 102) and provides functions similar to those in the ISDN layer 3 protocol.

In the above-mentioned conventional DECT system, the MAC sub-layer activates or deactivates a pair of physical channels to control bearer creation, maintenance and release operations, an empty physical channel selection operation and a received signal quality estimation operation.

However, the conventional MAC sub-layer has been developed to be suitable for voice-centered communication systems. For this reason, the conventional MAC sub-layer may be used to perform radio data communication to a certain degree, but it will cause many functional problems when being applied to multimedia communication service-based next generation communication systems. Noticeably, the next generation communication system will require highly compatible communication equipment to entirely solve various communication service problems resulting from option differentiation between communication equipment manufacturers and communication service operators and various problems resulting from different communication manners.

Further, the next generation communication system must be able to select many options because it will use multimedia information such as voice, video and text and require very excellent speech quality.

However, the MAC sub-layer of the conventional DECT system is adapted to provide only two functions, the former selecting a physical channel and the latter multiplexing control information into a packet in the form of a slot or demultiplexing the packet into such information. For this reason, the conventional MAC sub-layer is not applicable to the above-mentioned multimedia communication service.

SUMMARY OF THE INVENTION

Therefore, the present invention has been made in view of the above problems, and it is an object of the present invention to provide a communication system which is capable of providing a compatible multimedia communication service even if an originating terminal and a terminating terminal employ different communication manners, they are available from different manufacturers or they are operated by different communication service operators.

It is another object of the present invention to provide a signal processing method for performing various functions required by a communication system, using improved MAC sub-layers provided respectively in a plurality of mobile terminals and a base station.

It is yet another object of the present invention to provide a protocol operating method for executing a communication protocol among improved MAC sub-layers provided respectively in a plurality of terminals and a base station, according to requests from upper layers of the MAC sub-layers.

In accordance with one aspect of the present invention, there is provided a communication system which has a plurality of mobile terminals and a base station, each of the mobile terminals and/or base station comprising a medium access control sub-layer; upper layers of the medium access control sub-layer; and a lower layer of the medium access control sub-layer, wherein the medium access control sub-layer is configured to perform self-basic functions in response to basic function execution requests or functions associated with the upper layers or lower layer in response to requests therefrom.

In accordance with another aspect of the present invention, there is provided a method of processing signals using medium access control sub-layers in a communication system which has a plurality of mobile terminals and a base station, the medium access control sub-layers being provided respectively in the mobile terminals and base station, wherein each of the medium access control sub-layers of the mobile terminals and/or base station is configured to perform self-basic functions or functions associated with upper layers or a lower layer thereof if signal processing operations of a corresponding one of the mobile terminals, of the base station or between the corresponding mobile terminal and the base station are requested.

In accordance with yet another aspect of the present invention, there is provided a method of operating a communication protocol between a base station and a plurality of mobile terminals using medium access control sub-layers in a communication system, the medium access control sub-layers being provided respectively in the base station and mobile terminals, wherein each of the medium access control sub-layers is configured to selectively perform an initialization mode step, an idle mode step and a radio resource allocation mode step in response to requests from upper layers thereof.

BRIEF DESCRIPTION OF THE DRAWINGS

The above and other objects, features and advantages of the present invention will be more clearly understood from the following detailed description taken in conjunction with the accompanying drawings, in which:

FIGS. 7A to 7J are flowcharts illustrating various signal processing operations in FIG. 6;

FIG. 10 is a view illustrating formats of the messages in FIG. 9;

FIG. 11 is a view illustrating formats of information elements in the messages in FIG. 9;

FIG. 12 is a view illustrating a format of an establishment cause in FIG. 11;

FIG. 13 is a view illustrating a format of a paging channel number in FIG. 11.

DETAILED DESCRIPTION OF THE PREFERRED EMBODIMENTS

Figure 1:
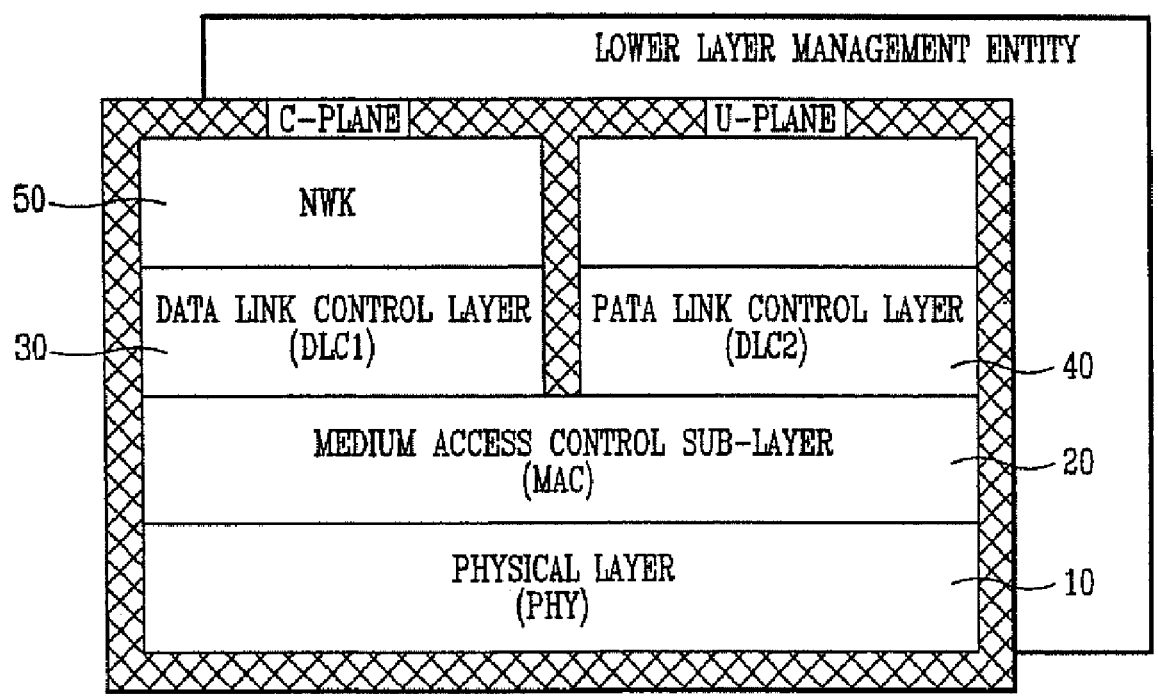
FIG. 1 is a block diagram of a protocol stack used in a conventional DECT system.
Figure 2:
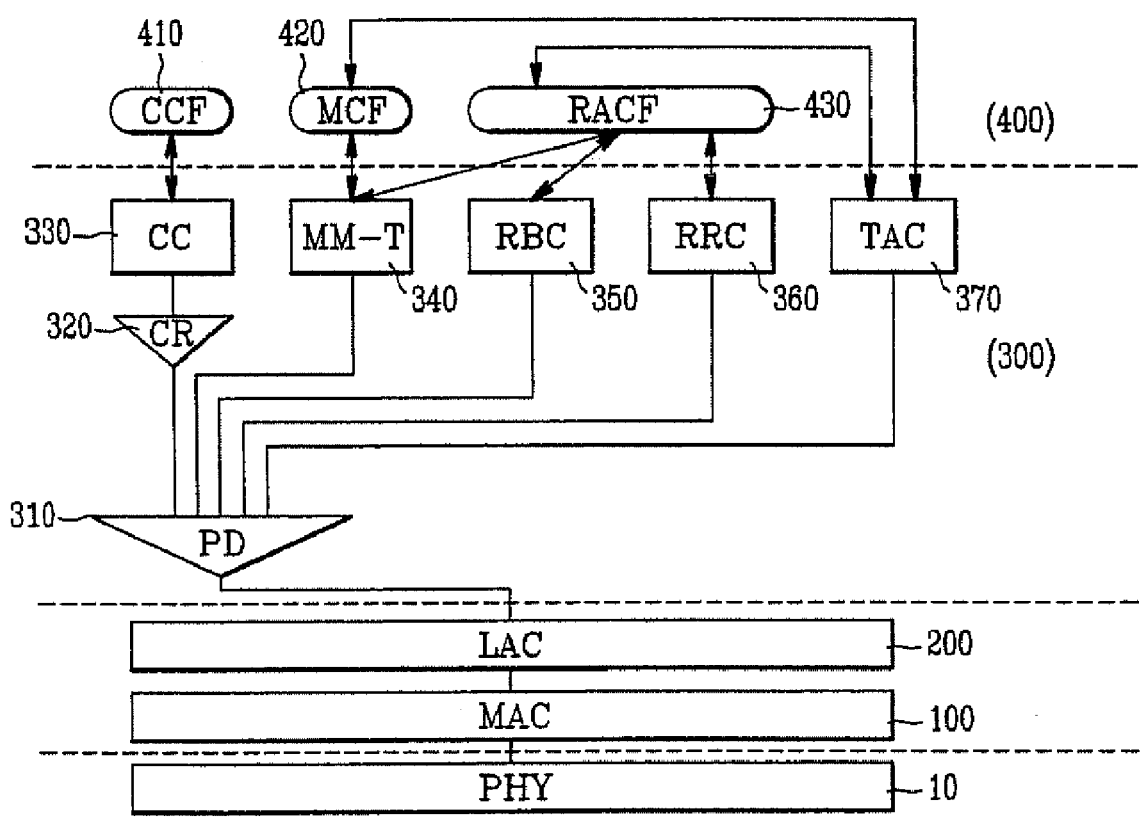
FIG. 2 is a block diagram of a protocol stack provided in each mobile terminal or base station in a communication system in accordance with a first embodiment of the present invention.

FIG. 2 is a block diagram of a protocol stack provided in each terminal or base station in a communication system in accordance with a first embodiment of the present invention.

With reference to FIG. 2, the protocol stack is composed of a physical layer (PHY) 10, a MAC sub-layer 100 which is an upper layer of the PHY 10, a link access control (referred to hereinafter as LAC) sub-layer 200 which is an upper layer of the MAC sub-layer 100, an upper layer 300 of the LAC sub-layer 200, and an application layer 400 which is an upper layer of the layer 300. The upper layer 300 includes a protocol discriminator (PD) 310, call reference (CR) 320, call control (CC) 330, mobility management entity (M-T) 340, radio bearer control entity (RBC) 350, radio resource control entity (RRC) 360 and terminal association control entity (TAC) 370. The application layer 400 includes a call control function (CCF) 410, mobile control function (MCF) 420 and radio access control function (RACF) 430.

In the communication protocol of the present invention, the MAC sub-layer 100 can perform self-basic functions and functions associated with the upper and lower layers.

The basic functions of the MAC sub-layer 100 are a random access control information transfer function, a control information transfer function, a user information transfer function, framing/deframing functions, segmentation/reassembly functions, functions of dividing a LAC frame into physical channels and vice versa, a CRC function, a MAC sub-layer frame error detection function, and a rate adaptation (padding) function of adjusting the number of bits suitably for a radio frame.

The associated functions of the MAC sub-layer 100 are a synchronization information control function, a system information control function, physical channel activation/deactivation functions, quality monitoring and reporting functions of, for the maintenance of traffic channel quality (FER), supporting power control, triggering a handover or reporting a channel condition upon traffic channel allocation, and a multi-bearer sequencing function of sequencing a multi-code.

Figure 3:
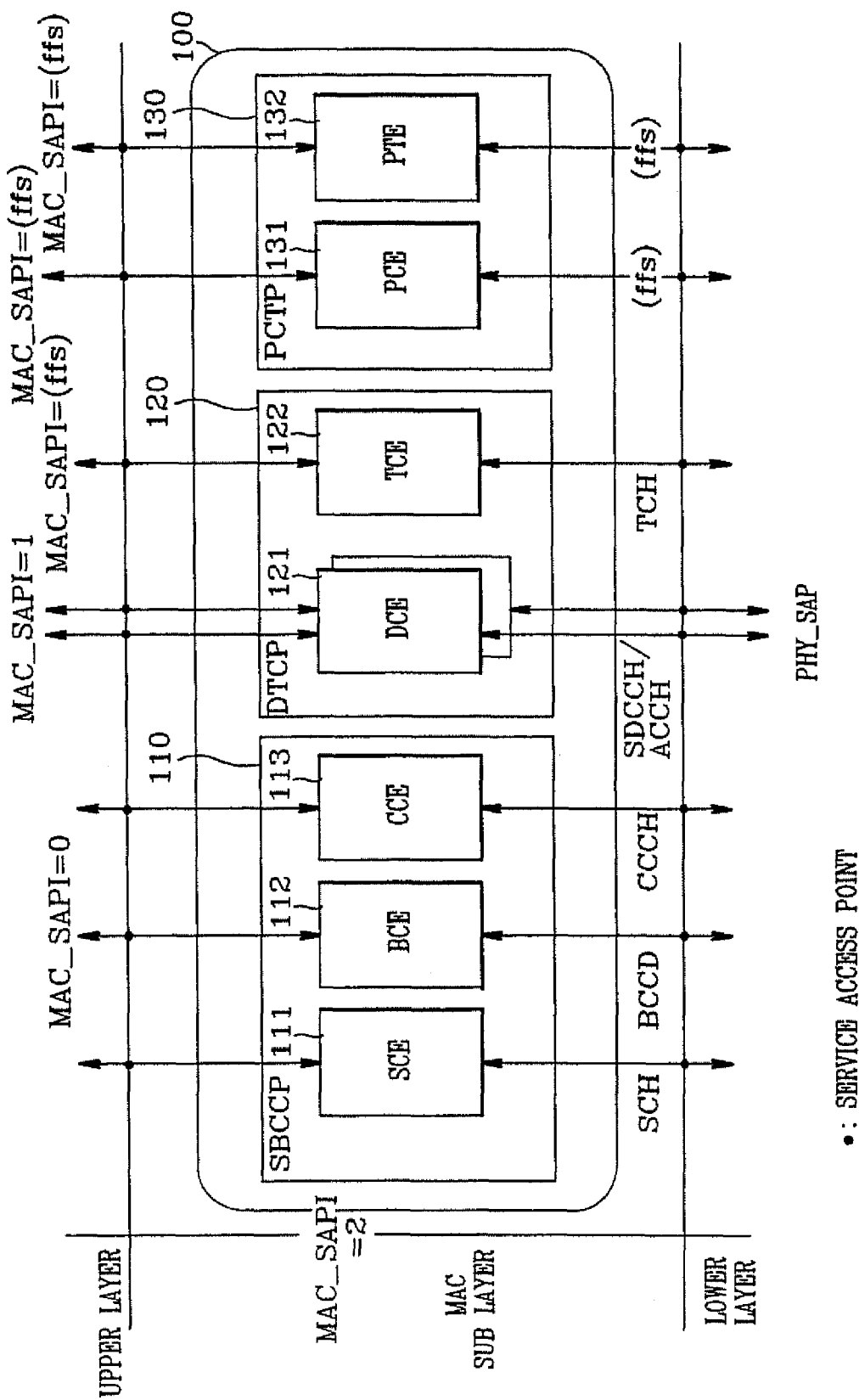
FIG. 3 is a block diagram illustrating the entire function of a MAC sub-layer in FIG. 2.

FIG. 3 is a block diagram illustrating the entire function of the MAC sub-layer 100 in FIG. 2.

With reference to FIG. 3, the MAC sub-layer 100 includes a synchronization/broadcasting/common control part (SBCCP) 110 for transferring synchronization information from a base station to a plurality of mobile terminals, setting a dedicated control channel between the base station and each of the mobile terminals and performing a call setting operation between the base station and each of the mobile terminals using the set control channel, a dedicated/traffic control part (DTCP) 120 for providing a connection-oriented point-to-point service to an upper layer of the SBCCP 110 on the basis of a bidirectional operation system between the base station and each of the mobile terminals and monitoring the quality of a radio link formed between the base station and each of the mobile terminals, and a packet control traffic part (PCTP) 130 for providing the connection-oriented point-to-point service to the upper layer of the SBCCP 110 on the basis of the bidirectional operation system between the base station and each of the mobile terminals and implementing a packet data service.

Channels provided in the MAC sub-layer 100 can basically be classified into a common control channel group and a dedicated control channel group.

The common control channel group includes a synchronization channel, broadcasting control channel and common control channel, which are a logical type of channels.

The synchronization channel (SCH) is used to transfer time information for system time and base information for base station identification.

The broadcasting control channel (BCCH) is used to broadcast general system information. The system information includes access parameter information for access to the base station by each of the mobile terminals, adjacent cell information indicative of radio frequency (RF) information of an adjacent cell, and available frequency information.

The common control channel (CCCH) is used to set a stand alone dedicated control channel (SDCCH) between each of the mobile terminals and the base station. In the preferred embodiment of the present invention, the CCCH includes a paging channel (PCH) for paging a terminating end, a random access channel (RACH) for access to the base station by each of the mobile terminals, and a forward access channel (FACH) for response of the base station to the access of each of the mobile terminals. Here, the RACH and FACH are used in pair.

The dedicated control channel group includes the SDCCH, an associated control channel and traffic channel, which are a logical type of channels.

The SDCCH is a connection-oriented bidirectional logical channel formed between each of the mobile terminals and the base station. All signal information from the setting of the SDCCH till the communication state are transferred through the SDCCH. For example, terminal association (TA) setup information and call setup information may be transferred through the SDCCH.

The associated control channel (ACCH) is a connection-oriented bidirectional logical channel associated with the traffic channel. All signal information after the communication state are transferred through the ACCH. For example, power control information and handover information may be transferred through the ACCH.

The traffic channel (TCH) is a connection-oriented bidirectional logical channel formed between each of the mobile terminals and the base station. A data transmission rate through the TCH is determined according to the service type.

As shown in FIG. 3, according to the present invention, the MAC sub-layer provides extended functions by reflecting a radio environment in the conventional MAC sub-layer.

In FIG. 3, the synchronization/broadcasting/common control part 110 includes a synchronization control entity (SCE) 111 for controlling the synchronization channel for transferring the system time information and base station identification information, a broadcast control entity (BCE) 112 for controlling the broadcasting control channel for broadcasting the general system information, and a common control channel entity (CCE) 113 for setting and controlling the SDCCH between the base station and each of the mobile terminals.

The dedicated/traffic control part 120 includes a dedicated control entity (DCE) 121 for controlling the connection-oriented bidirectional dedicated control channel formed between each of the mobile terminals and the base station, and a traffic control entity (TCE) 122 for controlling the connection-oriented bidirectional traffic channel formed between each of the mobile terminals and the base station and supporting a single or multi-bearer control function (user plane).

The control entities 111-122 are adapted to access the upper layers including the LAC sub-layer through three service access points (SAPs). In FIG. 3, MAC_SAPI(=0) is a service access point for the SCE, BCE and CCE, MAC_SAPI(=1) is a service access point for the DCE, and MAC_SAPI(=2) is a service access point for a system management entity on a management plane. Each service access point includes at least one independent connection endpoint.

Figure 4:
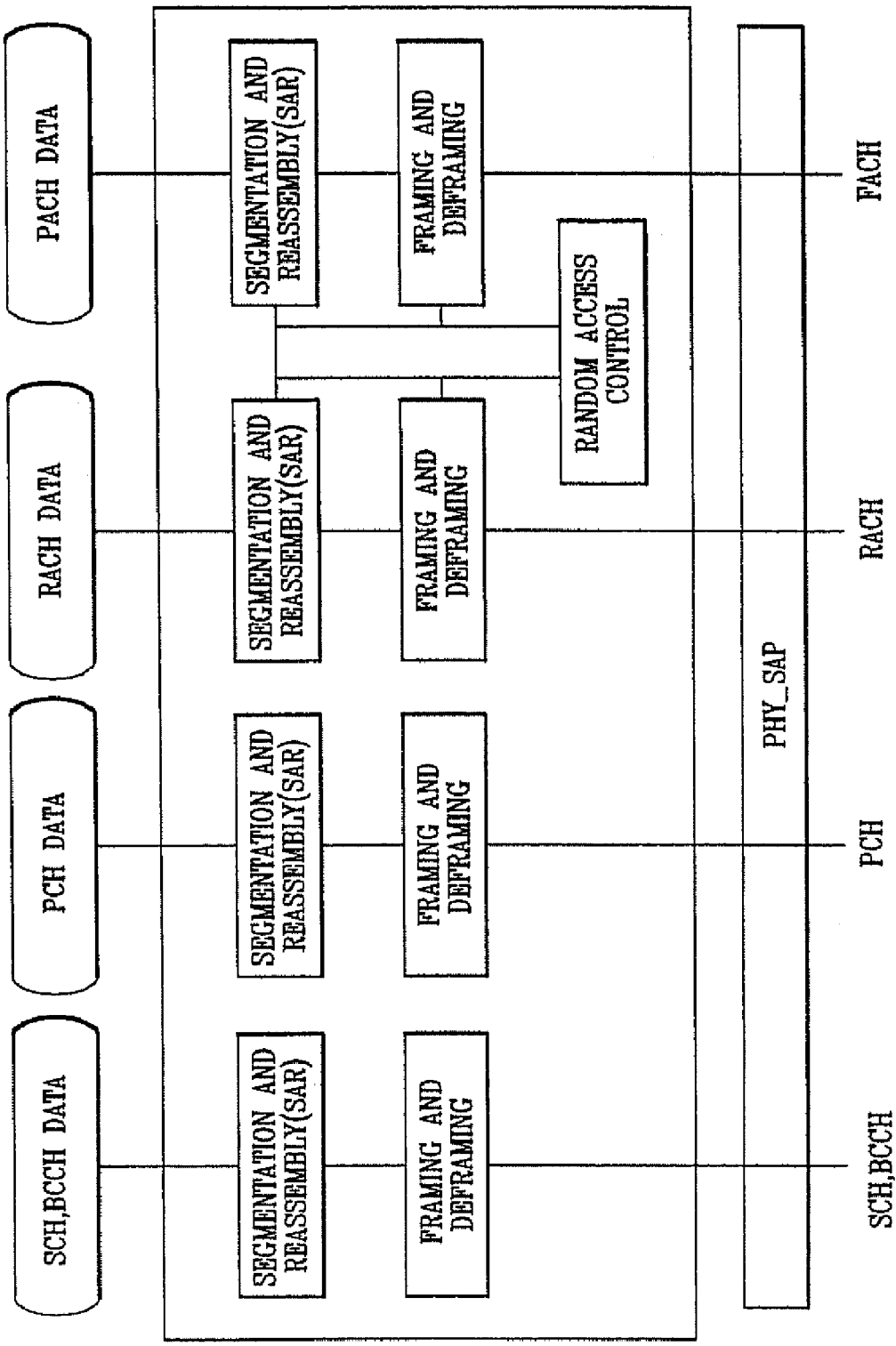
FIG. 4 is a block diagram illustrating functions of a synchronization/broadcasting/common control part in FIG. 3.

The functions of the synchronization control entity 111, broadcast control entity 112 and common control channel entity 113 in the synchronization/broadcasting/common control part 110 will hereinafter be described in detail with reference to FIG. 4.

The synchronization and broadcast control entities 111 and 112 are adapted to provide a point-to-multipoint service in which the base station transmits the system time information, base station identification information and system information to a plurality of mobile terminals. These synchronization and broadcast control entities 111 and 112 effect the point-to-multipoint service in a store and forward manner. The system information includes access parameter information for access to the base station by each of the mobile terminals, adjacent cell information indicative of RF information of an adjacent cell, and available frequency information.

The broadcast control entity 112 is adapted to perform segmentation and reassembly (SAR) operations with respect to a LAC frame according to a frame length of the BCCH. Also, the broadcast control entity 112 performs a framing or deframing operation according to a given frame format.

The common control channel entity 113 provides a random access control function for access between each of the mobile terminals and the base station. The random access control function is to set the SDCCH between each of the mobile terminals and the base station on the basis of the common control channel to effect a point-to-point connection therebetween. Each mobile terminal accesses the base station using the set control channel to perform a call setting operation.

Figure 5:
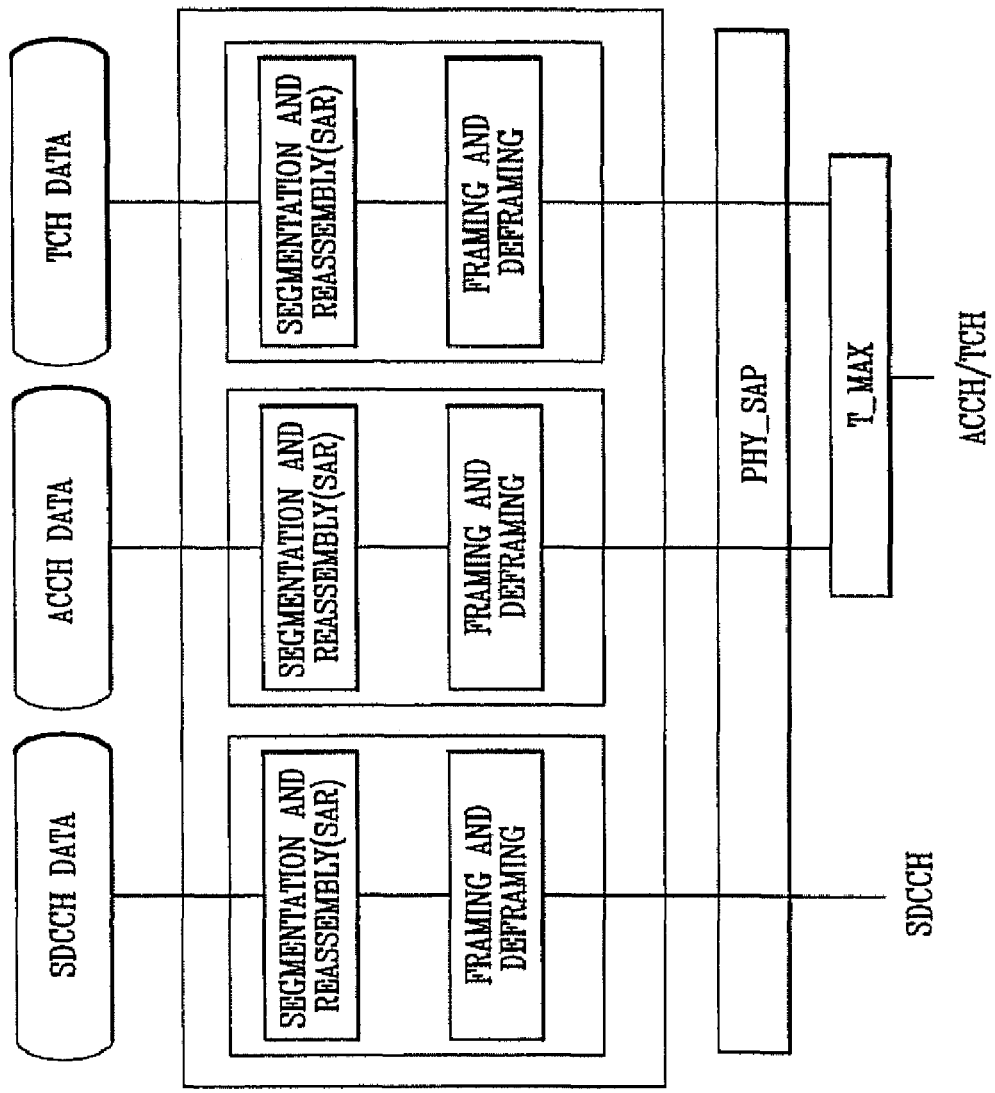
FIG. 5 is a block diagram illustrating functions of a dedicated/traffic control part in FIG. 3.

The functions of the dedicated control entity 121 and traffic control entity 122 in the dedicated/traffic control part 120 will hereinafter be described in detail with reference to FIG. 5.

The dedicated control entity 121 is adapted to provide a connection-oriented point-to-point service to the upper layer. The connection-oriented point-to-point service is operated according to a bidirectional operation system between the base station and each of the mobile terminals. The base station controls a plurality of dedicated channels at the same time, and each mobile terminal controls a single dedicated channel.

The traffic control entity 122 provides a radio link quality monitoring function which supports power control to physical channels to maintain the quality (FER) of a traffic frame and triggers a handover if the traffic frame quality and a pilot intensity fall below predetermined levels. Each mobile terminal may measure the radio link quality and report the measured result to the base station through the ACCH.

On the other hand, the MAC sub-layer can control a pluraty of traffic channels for a multi-bearer connection for a mass service. In the case of a (multimedia) service call requiring a plurality of codes, a multi-code sequencing function can be performed based on mechanisms for quality of service (QOS) negotiation and dynamic bandwidth allocation. Here, the base station performs resource management, allocation and state management for a plurality of codes and then transfers the resultant messages to each mobile terminal.

A method of processing signals using MAC sub-layers in a communication system in accordance with a second embodiment of the present invention will hereinafter be described with reference to FIGS. 6 and 7A to 7J.

Figure 6:
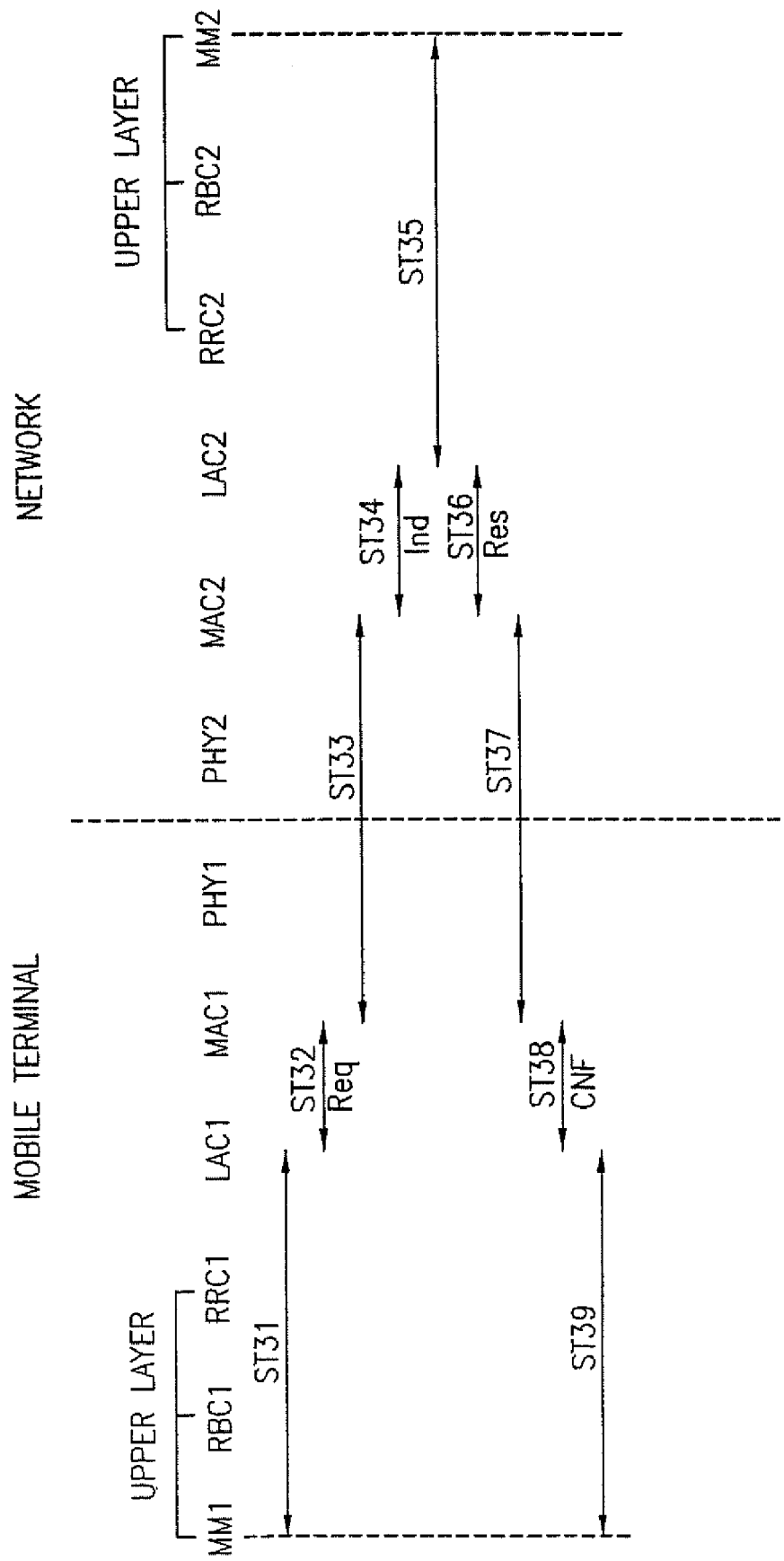
FIG. 6 is a flowchart illustrating a method of processing signals using MAC sub-layers in a communication system in accordance with a second embodiment of the present invention.

FIG. 6 is a flowchart illustrating an operation of controlling signals between MAC sub-layers of a mobile terminal (MT) and a network (NTWK) (or base station).

With reference to FIG. 6, first, an upper layer (MM1, RBC1 or RRC1) or application layer of the MT transfers a desired control command in the form of a primitive to a link access control 1(LAC1) of the MT at step ST31. The LAC1 transfers a request message based on the control command from the upper layer or application layer of the MT to a MAC1 of the MT at step ST32. The MAC1 of the MT sends the request message from the LAC1 to a MAC2 of the NTWK sequentially through physical layers (PHY1 and PHY2) of the MT and NTWK at step ST33. Then, the MAC2 transfers the request message from the MAC1 to a LAC2 of the NTWK at step ST34. The LAC2 transfers the request message from the MAC2 to an upper layer (M2, RBC2 or RRC2) or application layer of the NTWK at step ST35 and feeds a response signal back to the MAC2 at step ST36. Then, the MAC2 sends the response signal from the LAC2 to the MAC1 sequentially through the PHY2 and PHY1 of the NTWK and MT at step ST37. Upon receiving the response signal from the MAC2, the MAC1 transfers a confirm signal regarding execution of the initial control command to the LAC1 at step ST38. Then, the LAC1 reports the control command execution to the upper layer or application layer.

Noticeably, all control commands do not follow the order shown in FIG. 6, and they may be advanced along selective paths according to their characteristics.

Operation of Controlling Broadcasting of Synchronization Information or System Information The operation of controlling the broadcasting of the synchronization information or system information provides a point-to-multipoint service for time information, system information or paging. This broadcasting control operation effects the point-to-multipoint service in a store and forward manner. Various system parameters received by a mobile terminal (MT) are updated with the latest information.

Figure 7A:
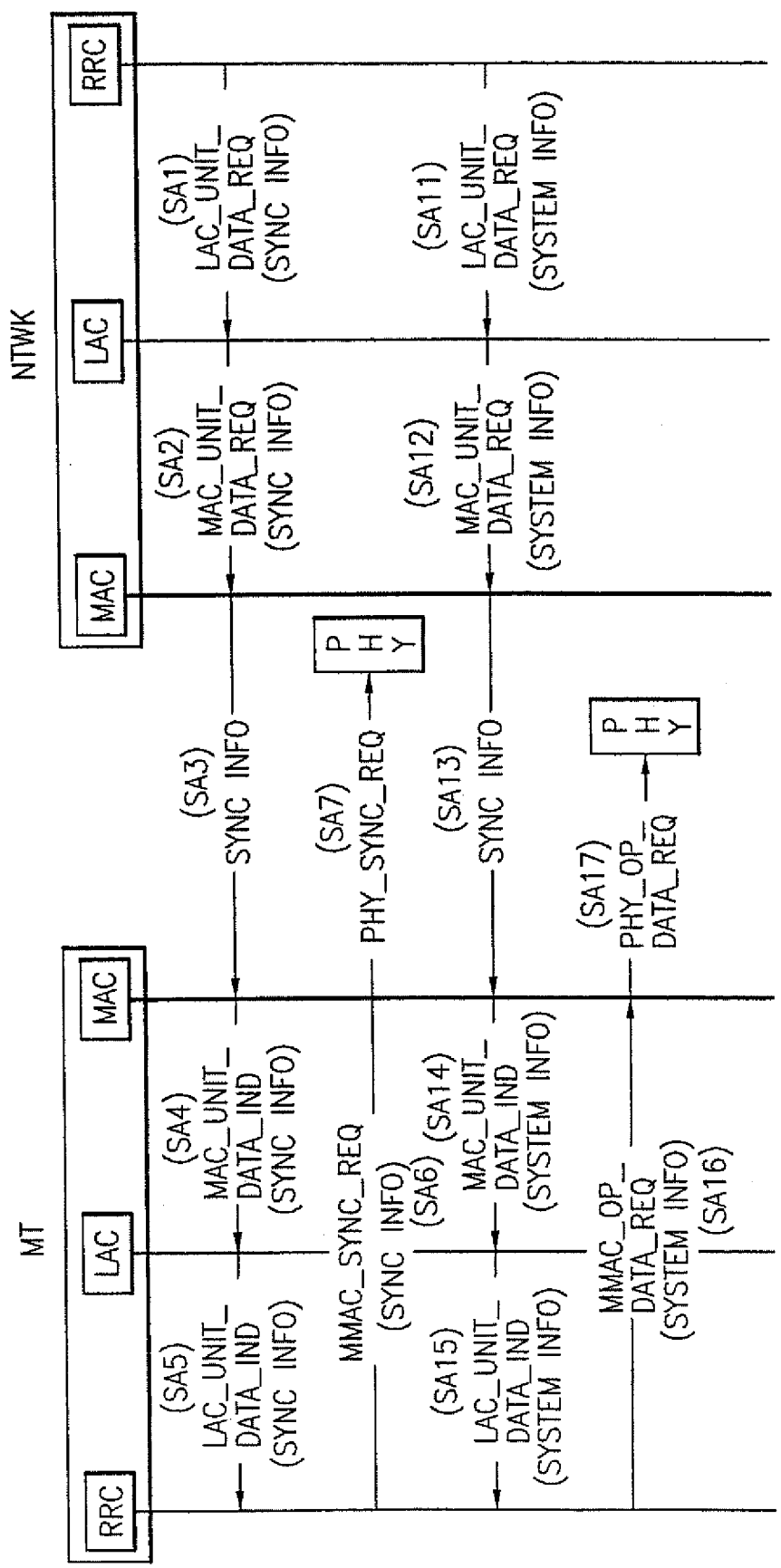

With reference to FIG. 7A, a radio resource control (RRC) of a network (NTWK) transfers a message in the form of a primitive LAC_UNIT_DATA_REQ to a link access control (LAC) of the NTWK at step SA1 or SA11. Upon receiving the primitive LAC_UNIT_DATA_REQ from the RRC, the LAC of the NTWK transfers a message in the form of a primitive MAC_UNIT_DATA_REQ to a MAC of the NTWK at step SA2 or SA12. Then, the MAC of the NTWK effects a broadcasting control service for the synchronization information or system information in the store and forward manner at step SA3 or SA13.

Upon receiving a synchronization information or system information request message from the MAC of the NTWK a MAC of the MT transfers a message in the form of a primitive MAC_UNIT_DATA_IND to a LAC of the MT at step SA4 or SA14. Then, the LAC of the MT transfers a message in the form of a primitive LAC_UNIT_DATA_IND to an RRC of the MT at step SA5 or SA15.

Then, the RRC of the MT transfers a primitive MMAC_SYNC_REQ to the MAC of the MT at step SA6 or SA16. The primitive MMAC_SYNC_REQ is used for time synchronization between the NTWK and the MT. Upon receiving the primitive MMAC_SYNC_REQ from the RRC of the MT, the MAC of the MT transfers a synchronization information request primitive PHY_SYNC_REQ to a physical layer (PHY) at step SA7 or SA17.

Random Access Control Operation

The random access control operation is performed to set an SDCCH between a mobile terminal (MT) and a network (NTWK) on the basis of the common control channel to effect a point-to-point connection therebetween. The MT can access the NTWK through the random access control operation and execute a call setting operation using the set signal channel.

Figure 7B:
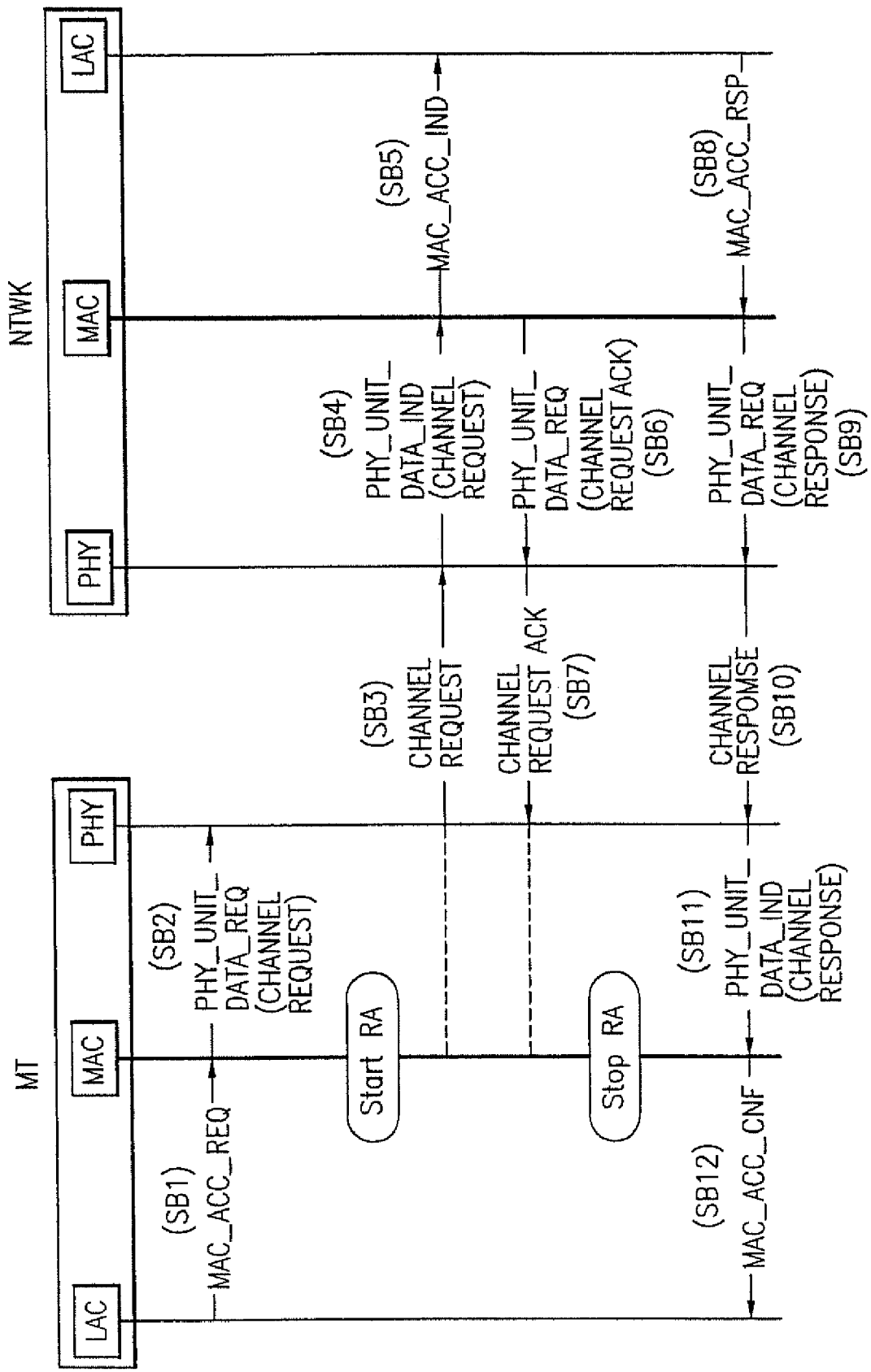

With reference to FIG. 7B, a LAC of the MT transfers a primitive MAC_ACC_REQ to a MAC of the MT at step SB1 to request a radio resource for setting the SDCCH between the MT and the NTWK. Upon receiving the primitive MAC_ACC_REQ from the LAC of the MT, the MAC of the MT transfers a message in the form of a primitive PHY_UNIT_DATA_REQ to a physical layer (PHY) of the MT at step SB2.

Then, the PHY of the MT sends a primitive PHY_UNIT_DATA_IND to a MAC of the NTWK through a physical layer (PHY) of the NTWK at steps SB3 and SB4 to notify it that the MT requests the radio resource for the setting of the SDCCH.

Upon receiving a channel request message from the MT, the MAC of the NTWK transfers a primitive MAC_ACC_IND to a LAC of the NTWK at step SB5 to request the radio resource.

At this time, the MAC of the NTWK transfers an acknowledge message in the form of a primitive PHY_UNIT_DATA_REQ to the PHY of the NTWK at step SB6 to acknowledge the channel request from the MT. Then, the PHY of the NTWK sends the channel request acknowledge message from the MAC of the NTWK to the PHY of the MT.

On the other hand, upon receiving the primitive MAC_ACC_IND from the MAC of the NTWK, the LAC of the NTWK transfers a primitive MAC_ACC_RSP from an RRC of the NTWK to the MAC of the NTWK at step SB8 to indicate that the RRC of the NTWK accepts or rejects the radio resource request. Then, the MAC of the NTWK transfers a message in the form of a primitive PHY_UNIT_DATA_REQ to the PHY of the NTWK at step SB9. The PHY of the NTWK sends a channel response to the radio resource request to the PHY of the MT at step SB10. Upon receiving the channel response from the PHY of the NTWK, the PHY of the MT transfers a message in the form of a primitive PHY_UNIT_DATA_IND to the MAC of the MT at step SB11. Then, the MAC of the MT transfers a primitive MAC_ACC_CNF to the LAC of the MT at step SB12 to inform it that the allocation of a new radio resource has been completed.

Physical Channel Activation/Deactivation Control Operations

The physical channel activation/deactivation control operations are to perform control transfer functions for activation/deactivation of physical channels. These physical channel activation/deactivation control operations are applied in common to a dedicated signal channel and traffic channel.

Figure 7C:
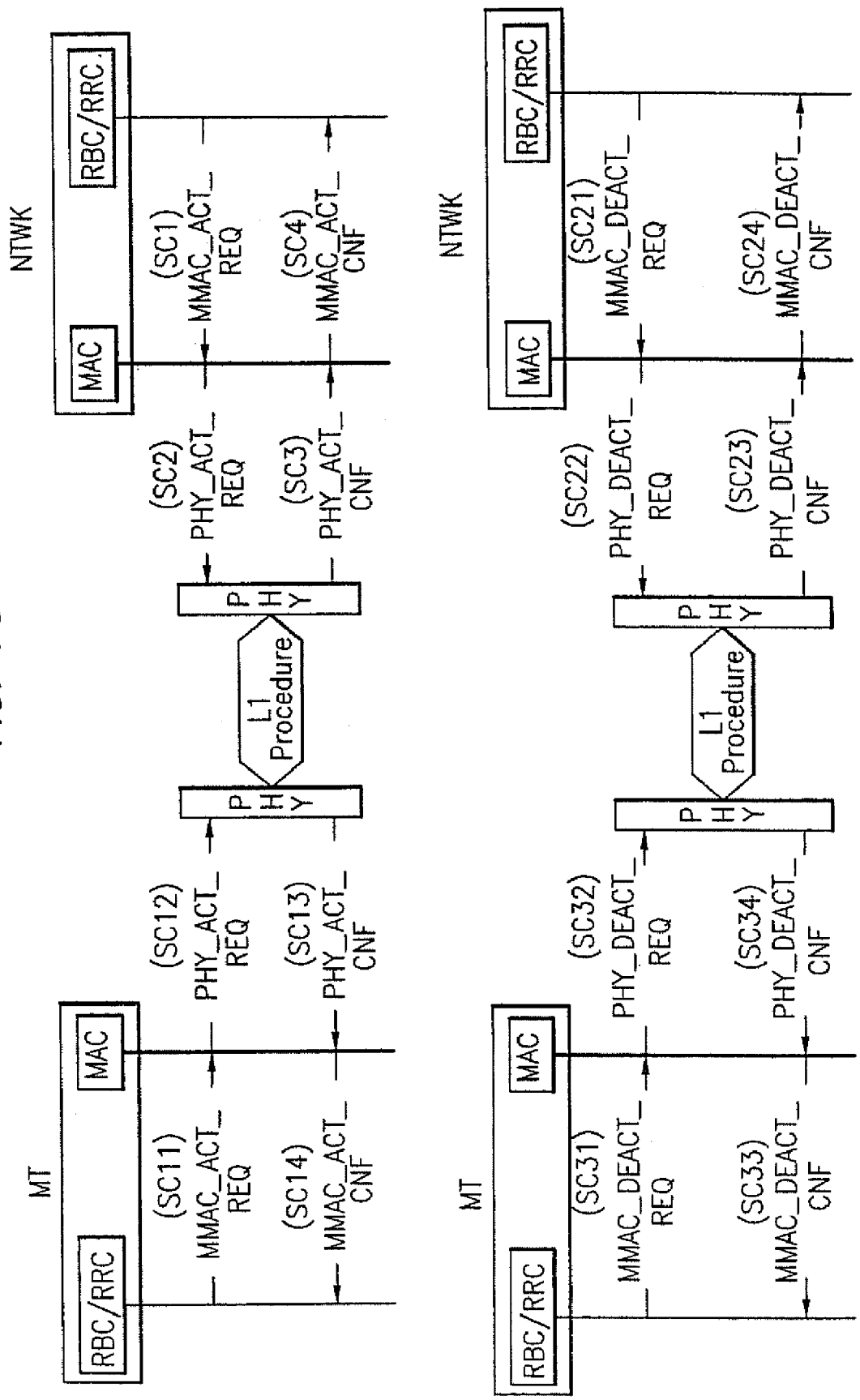

With reference to FIG. 7C, an RBC or RRC of a mobile terminal (MT) or network (NTWK) transfers a primitive MMAC_ACT_REQ to a MAC of the MT or NTWK at step SC11 or SC1 to activate a communication path thereto. Alternatively, in order to deactivate the communication path to the MAC of the MT or NTWK, the RBC or RRC of the MT or NTWK transfers a primitive MMAC_DEACT_REQ to the associated MAC at step SC31 or SC21. Then, the MAC of the MT or NTWK transfers a primitive PHY_ACT_REQ to a physical layer (PHY) of the MT or NTWK at step SC12 or SC2 to activate a communication path thereto. Alternatively, in order to deactivate the communication path to the PHY of the MT or NTWK, the MAC of the MT or NTWK transfers a primitive PHY_DEACT_REQ to the associated PHY at step SC32 or SC22.

Then, hardware or software of a communication path for the physical channel activation or deactivation is set in the PHY of the MT or NTWK. Also, the PHY of the MT or NTWK transfers a primitive PHY_ACT_CNF to the associated MAC at step SC13 or SC3 to inform it that the communication path has been activated. Alternatively, in order to inform the MAC of the MT or NTWK that the communication path has been deactivated, the PHY of the MT or NTWK transfers a primitive PHY_DEACT_CNF to the associated MAC at step SC33 or SC23.

Upon receiving the primitive PHY_ACT_CNF from the PHY of the MT or NTWK, the MAC of the MT or NTWK transfers a primitive MMAC_ACT_CNF to the associated RBC or RRC at step SC14 or SC4 to inform it that the communication path has been activated. Alternatively, upon receiving the primitive PHY_DEACT_CNF from the PHY of the MT or NTWK, the MAC of the MT or NTWK transfers a primitive MMAC_DEACT_CNF to the associated RBC or RRC at step SC34 or SC24 to inform it that the communication path has been deactivated.

Cell Condition or Channel Condition Reporting Operation

The cell condition or channel condition reporting operation is performed to satisfy a subscriber's service quality requirement upon the allocation of a traffic channel. A mobile terminal (MT) measures a cell condition or channel condition and reports the measured result to a network (NTWK).

Upon receiving a cell condition or channel condition measurement request from an RRC of the MT, a MAC of the MT instructs a physical layer (PHY) of the MT to measure a cell condition or channel condition. The PHY of the MT measures the cell condition or channel condition and feeds the measured result back to the MAC of the MT. Then, the MAC of the MT reports the measured result fed from the PHY of the MT to the RRC of the MT. The RRC of the MT sends the measured result reported by the MAC of the MT to the NTWK through a LAC of the MT. As a result, the NTWK allocates a traffic channel on the basis of the measured result from the MT. The NTWK obtains a measurement condition (periodic or as needed) on the cell condition or channel condition on the basis of a system information message.

With reference to FIGS. 7D and 7E, an RRC of the NTWK transfers a primitive LAC_UNIT_DATA_REQ to a LAC of the NTWK at step SD1 or SE1 to request cell condition or channel condition measurement. Upon receiving the primitive LAC_UNIT_DATA_REQ from the RRC of the NTWK the LAC of the NTWK transfers a message in the form of a primitive MAC_UNIT_DATA_REQ to a MAC of the NTWK at step SD2 or SE2. Then, the MAC of the NTWK sends a cell condition or channel condition measurement request message to the MAC of the MT at step SD3 or SE3. Upon receiving the cell condition or channel condition measurement request message from the MAC of the NTWK, the MAC of the MT transfers a primitive MAC_UNIT_DATA_IND to the LAC of the MT at step SD4 or SE4 to request cell condition or channel condition report. The LAC of the MT transfers a primitive LAC_UNIT_DATA_IND to the RRC of the MT at step SD5 or SE5 to inform it of the cell condition or channel condition report request. The RRC of the MT transfers a primitive MMAC_MEASURE_REQ to the PHY of the MT at step SD6 or SE6 to request cell condition or channel condition measurement. Then, the PHY of the MT transfers a primitive MMAC_MEASURE_CNF to the RRC of the MT at step SD7 or SE7 to inform it that the cell condition or channel condition measurement has been completed.

Upon receiving the primitive MMAC_MEASURE_CNF from the PHY of the MT, the RRC of the MT transfers a primitive LAC_UNIT_DATA_REQ to the LAC of the MT at step SD8 or SE8 to inform it of the result of the cell condition or channel condition measurement requested by the NTWK. Then, the LAC of the MT transfers a primitive MAC_UNIT_DATA_REQ to the MAC of the MT at step SD9 or SE9 to inform it of the measured result of the cell condition or channel condition. The MAC of the MT sends the measured result of the cell condition or channel condition to the MAC of the NTWK at step SD10 or SE10. Upon receiving the cell condition or channel condition measured result from the MAC of the MT, the MAC of the NTWK transfers a primitive MAC_UNIT_DATA_IND to the LAC of the NTWK at step SD11 or SE11. Then, the LAC of the NTWK transfers a primitive LAC_UNIT_DATA_IND to the RRC of the NTWK at step SD12 or SE12.

LAC Information Transfer Operation

If a dedicated channel (signal channel or traffic channel) is successfully set between a mobile terminal (MT) and a network (NTWK, then it performs two types of information transfer functions, or a control information transfer function and a user information transfer function.

Figure 7F:
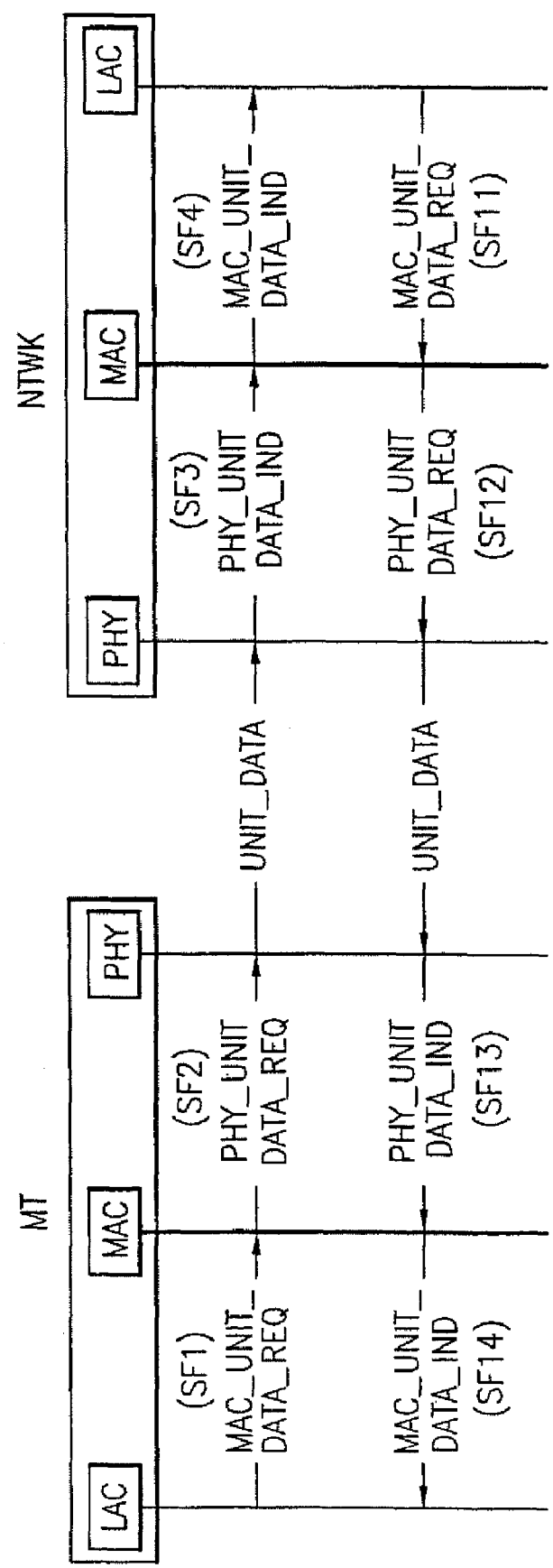

With reference to FIG. 7F, a LAC of the MT or NTWK transfers a primitive MAC_UNIT_DATA_REQ to a MAC of the MT or NTWK at step SF1 or SF11 to request control information and user information. Upon receiving the primitive MAC_UNIT_DATA_REQ from the LAC of the MT or NTWK the MAC of the MT or NTWK transfers a message in the form of a primitive PHY_UNIT_DATA_REQ to a physical layer (PHY) of the MT or NTWK at step SF2 or SF12. Then, the PHY of the MT or NTWK transfers a message in the form of a primitive PHY_UNIT_DATA_IND to the associated MAC at step SF3 or SF13. Upon receiving the primitive PHY_UNIT_DATA_IND from the PHY of the MT or NTWK the MAC of the MT or NTWK transfers a message in the form of a primitive MAC_UNIT_DATA_IND to the associated LAC at step SF4 or SF14. As a result, the control information and user information can be transferred from the MT or NTWK to the NTWK or MT.

MAC Cipher Control Transfer Operation

In the MAC cipher control transfer operation, an MM of a mobile terminal (MT) or network (NTWK) requests a cipher operation of a MAC of the MT or NTWK for the protection of data. In practice, the cipher operation is performed by a physical layer (PHY) of the MT or NTWK and the ciphered result is transferred to the MM through the MAC.

Figure 7G:
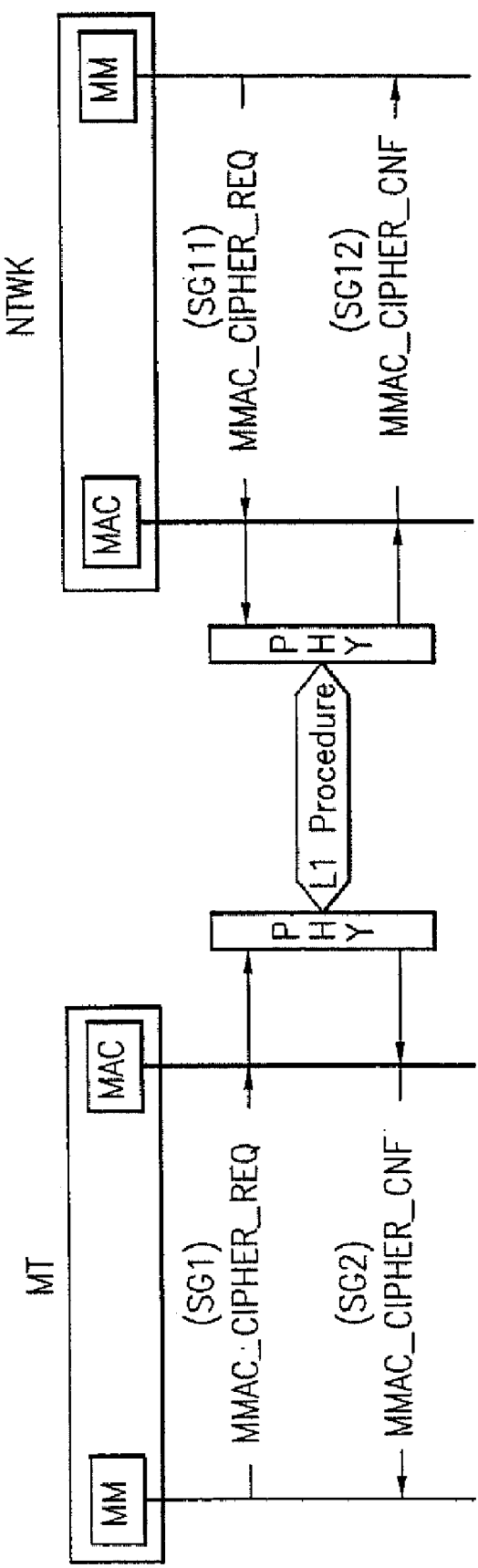

With reference to FIG. 7G, the MM of the MT or NTWK transfers a primitive MMAC_CIPHER_REQ to the associated MAC at step SG1 or SG11 to request the cipher operation. Then, the MAC of the MT or NTWK transfers a primitive PHY_CIPHER_REQ from the associated MM to the associated PHY.

The PHY of the MT or NTWK performs the cipher operation for user data and then transfers a primitive PHY_CIPHER_CNF to the associated MAC to inform it that the cipher operation has been completed. Upon receiving the primitive PHY_CIPHER_CNF from the PHY of the MT or NTWK, the MAC of the MT or NTWK transfers a primitive MMAC_CIPHER_CNF to the associated MM at step SG2 or SG12 to inform it that the cipher operation has been completed.

MAC Handover Control Operation

The MAC handover control operation is performed to change a radio resource of a specific cell because the radio resource is inferior in quality to that of an adjacent cell. To this end, a MAC of a mobile terminal (MT) or network (NTWK) informs an RRC or RBC of the MT or NTWK of the current radio condition. Then, the RRC or RBC of the MT or NTWK applies a handover command to the associated MAC. The handover operation is performed by a physical layer (PHY) of the MT or NTWK and the handover result is transferred to the RRC or RBC of the MT or NTWK.

Figure 7H:
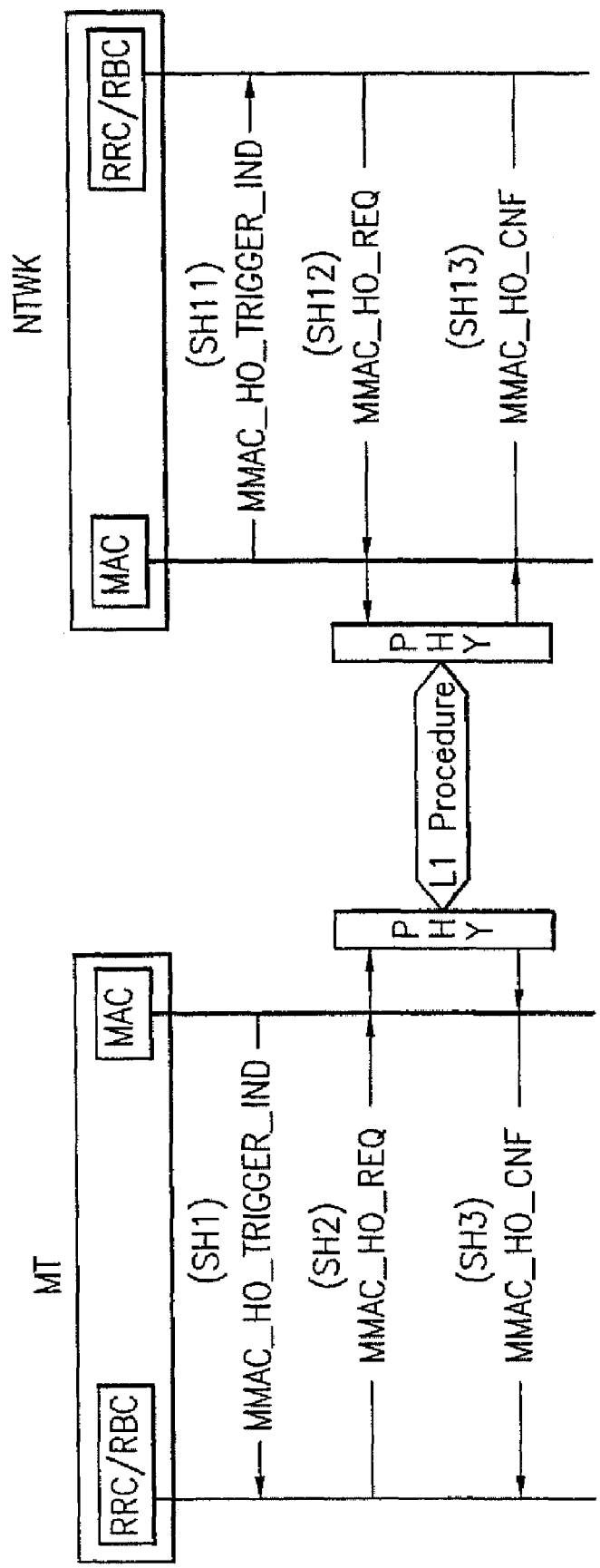
Figure 71:
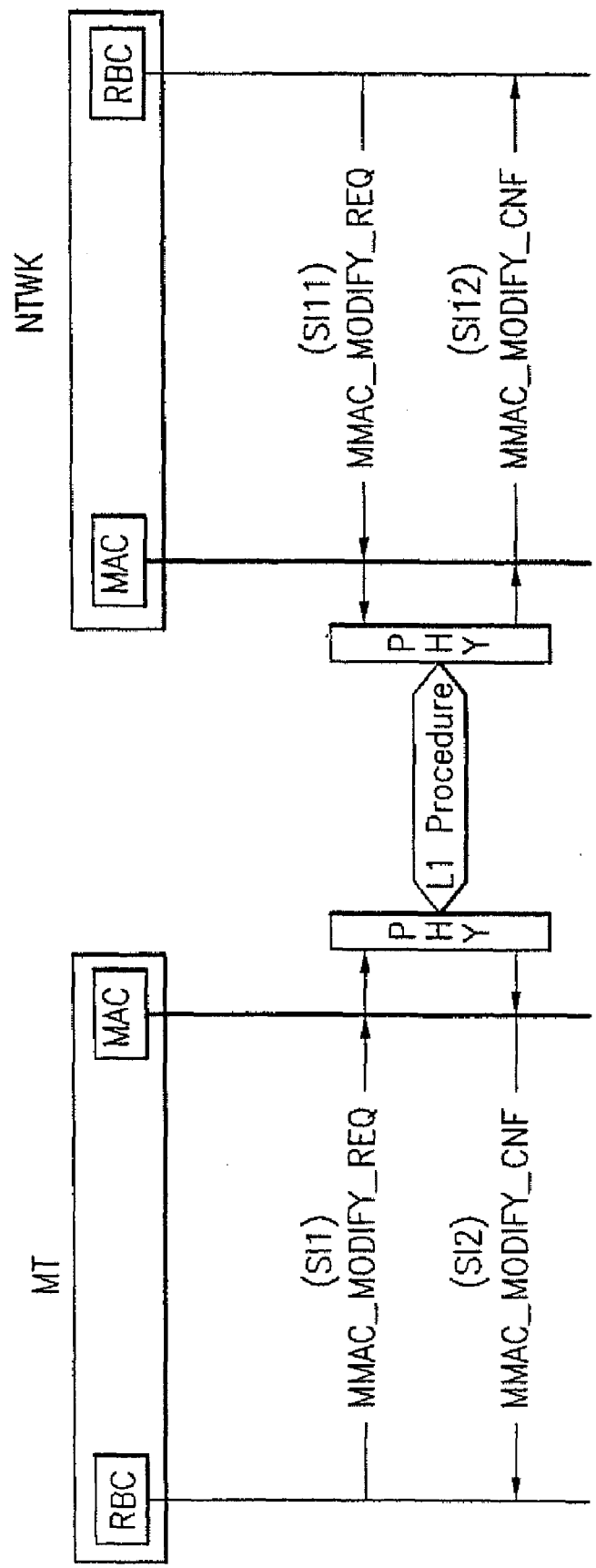

With reference to FIG. 7H, the MAC of the MT or NTWK measures an error rate, interference level, pilot signal level, etc. of a received transmission frame. When the measured results reach threshold values requiring the handover operation, the MAC of the MT or NTWK transfers a primitive MMAC_HO_TRIGGER_IND to the associated RRC or RBC at step SH1 or SH11 to request the handover operation. Upon receiving the primitive MMAC_HO_TRIGGER_IND from the MAC of the MT or NTWK, the RRC or RBC of the MT or NTWK transfers a primitive MMAC_HO_REQ to the associated PHY at step SH2 or SH12 to request the handover operation.

Upon receiving the primitive MMAC_HO_REQ from the RRC or RBC of the MT or NTWK, the PHY of the MT or NTWK performs the handover operation and then transfers a primitive PHY_HO_CNF to the associated MAC to inform it that the handover operation has been performed. Then, the MAC of the MT or NTWK transfers a primitive MMAC_HO_CNF to the associated RRC or RBC at step SH3 or SH13.

MAC Communication Path Modification Control Operation

The MAC communication path modification control operation is performed to modify a communication path because a cell condition or channel condition is not good. To this end, an RBC of a mobile terminal (MT) or network (NTWK) requests a MAC of the MT or NTWK to modify a communication path. Then, the MAC of the MT or NTWK informs the associated RBC that the communication path has been modified.

With reference to FIG. 7I, the RBC of the MT or NTWK transfers a primitive MMAC_MODIFY_REQ to a physical layer (PHY) of the MT or NTWK through the associated MAC at step SI1 or SI11 to request it to modify attributes of a communication path.

Upon receiving the primitive MMAC_MODIFY_REQ from the RBC of the MT or NTWK, the PHY of the MT or NTWK performs the requested communication path modification operation and then transfers a primitive MMAC_MODIFY_CNF to the RBC of the MT or NTWK through the associated MAC at step SI2 or SI12 to inform it that the communication path modification operation has been completed.

MAC Radio Failure Condition Control Operation

In the MAC radio failure condition control operation, a MAC of a mobile terminal (MT) or network (NTWK) informs an RRC or RBC of the MT or NTWK of all failure conditions of a radio environment such as radio resource insufficiency, network equipment failure, radio resource use disable, radio resource modification disable, etc. Then, the RRC or RBC of the MT or NTWK requests the associated MAC to stop the setting of a radio bearer, and the MAC of the MT or NTWK informs the associated RRC or RBC of the stopped result.

Figure 7J:
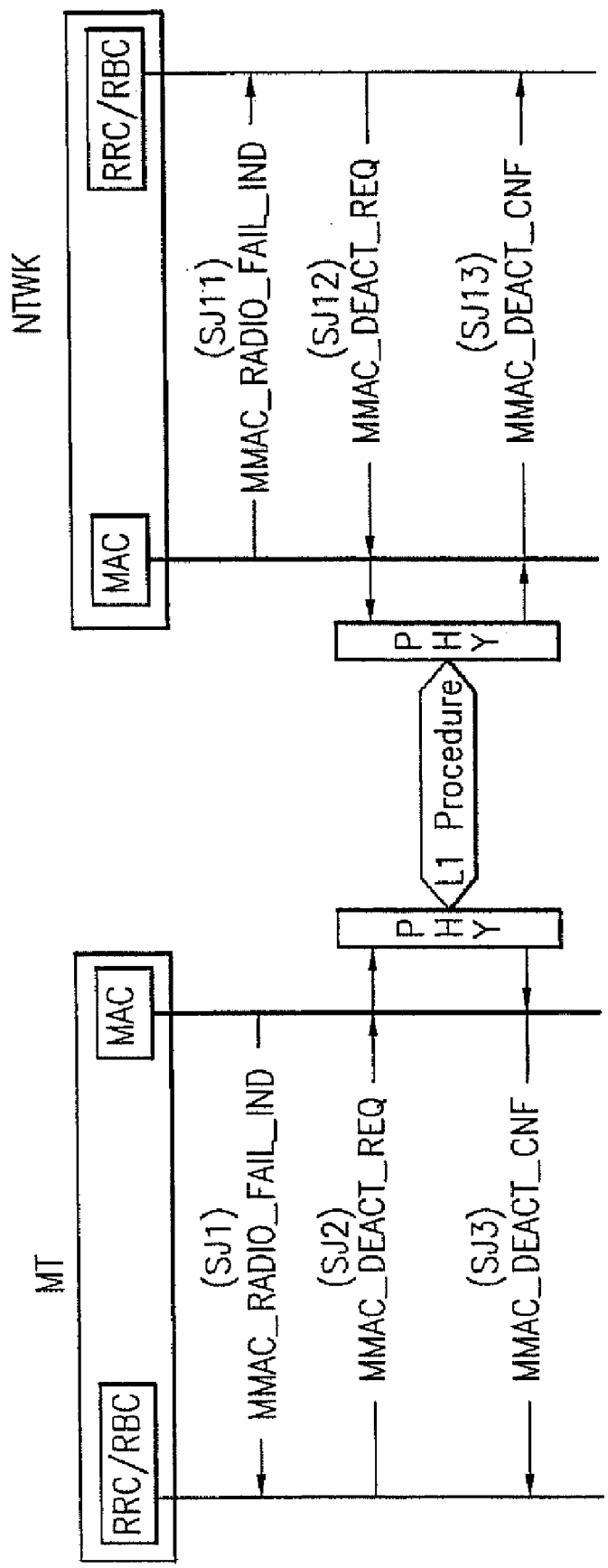

With reference to FIG. 7J, if a radio communication connection to a communication path fails, the MAC of the MT or NTWK transfers a primitive MMAC_RADIO_FAIL_IND to the associated RRC or RBC at step SJ1 or SJ11. The RRC or RBC of the MT or NTWK recognizes the radio communication connection failure condition in response to the primitive MMAC_RADIO_FAIL_IND from the associated MAC and then transfers a communication path deactivation request primitive MMAC_DEACT_REQ to a physical layer (PHY) of the MT or NTWK at step SJ2 or SJ12 to request it to stop the setting of a radio bearer. Then, the PHY of the MT or NTWK stops the setting of the radio bearer and transfers a primitive MMAC_DEACT_CNF to the RRC or RBC of the MT or NTWK through the associated MAC at step SJ3 or SJ13 to inform it that the communication path has been deactivated.

Figures 8, 9:
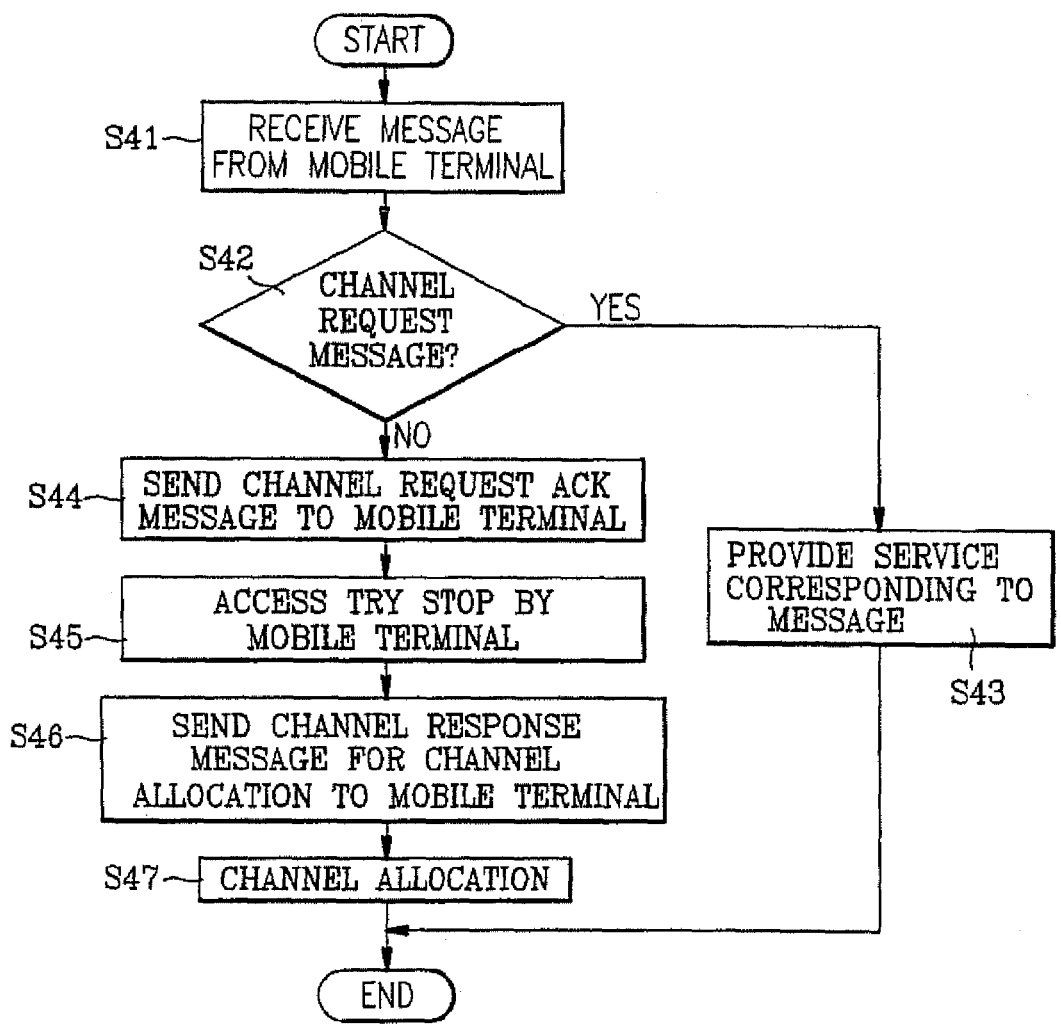
FIG. 8 is a flowchart illustrating a method of processing signals using MAC sub-layers in a communication system in accordance with a third embodiment of the present invention.
FIG. 9 is a view illustrating types of messages used in FIG. 8.

FIG. 8 is a flowchart illustrating a method of processing signals using MAC sub-layers in a communication system in accordance with a third embodiment of the present invention.

With reference to FIG. 8, for the provision of a call service between a base station and a mobile terminal through MACs included respectively therein, the mobile terminal has to send a channel request message to the base station through a reverse access channel (RACH). The channel request message is used for the request of a radio resource by the mobile terminal.

In this connection, the base station receives a message from a specific mobile terminal at step S41 and then checks at step S42 whether the received message is a channel request message through the RACH.

If it is checked at step S42 that the received message is not the channel request message, the base station provides a service corresponding to the received message at step S43. To the contrary, in the case where the received message is the channel request message, the base station sends a channel request acknowledge message through a forward access channel (FACH) at step S44.

Noticeably, the channel request acknowledge message is used only when the mobile terminal tries to access the network through the RACH.

Upon receiving the channel request acknowledge message from the base station, the mobile terminal stops trying to access the base station at step S45.

Then, the base station sends a channel response message for channel allocation to the mobile terminal at step S46.

Noticeably, the channel response message is used only when the mobile terminal tries to access the network through the RACH. If the MAC of the mobile terminal confirms the channel response message, then it transfers an access response confirm primitive to a link access control (LAC).

A data format of the channel response message is composed of a 1-octet address field, a 3-bit MAC frame type and a LAC sub frame.

The mobile terminal is allocated with the requested channel according to the channel response message from the base station at step S47.

The above-mentioned messages are formatted and sent according to logical channel types by the MACs of the mobile terminal and base station.

Namely, as shown in FIG. 9, the logical channel types are classified into a forward access channel (FACH) and a reverse access channel (RACH). The FACH is associated with the channel request acknowledge message and channel response message which are sent from the network to the mobile terminal. The RACH is associated with the channel request message which is sent from the mobile terminal to the network.

Each MAC of the mobile terminal and base station is adapted to determine whether a received message is the channel request acknowledge message, channel response message or channel request message, by checking low-order 3 bits of the received message. That is, as shown in FIG. 10, if the received message is "XXXXX001", it is determined as the channel request acknowledge message associated with the forward access channel. If the received message is "XXXXX010", it is determined as the channel response message associated with the forward access channel. In the case where the received message is "XXXXX000", it is determined as the channel request message associated with the reverse access channel.

TABLE 1

| 8 | 7 | 6 | 5 | 4 | 3 | 2 | 1 |
|---|---|---|---|---|---|---|---|
| | | | ADDRESS FIELD | | | | |
| RESERVED | | | | | MAC FRAME TYPE | | |
| CRC | | | | | | | |

The above table 1 shows a data frame format of the channel request acknowledge message. As seen from the above table 1, the data frame of the channel request acknowledge message is configured in an A' type frame format.

The A' type frame format is composed of a 1-octet address field region, a reserved region of high-order 5 bits of a 1 octet, a MAC frame type region of low-order 3 bits of the 1 octet, and a CRC region for the detection of a frame error.

A data frame of the channel response message is configured in an A'B type frame format, as seen from the below table 2.

TABLE 2

| 8 | 7 | 6 | 5 | 4 | 3 | 2 | 1 |
|---|---|---|---|---|---|---|---|
| | | | ADDRESS FIELD | | | | |
| RESERVED | | | | | MAC FRAME TYPE | | |
| CRC | | | | | | | |
| INFORMATION | | | | | | | |
| PADDING | | | | | EOF | | |

The A'B type frame format is composed of a 1-octet information region, a padding region of high-order 5 bits of a 1 octet, and an EOF region of low-order 3 bits of the 1 octet, in addition to the regions in the A' type frame format shown in the table 1.

TABLE 3

| 8 | 7 | 6 | 5 | 4 | 3 | 2 | 1 |
|---|---|---|---|---|---|---|---|
| | | | ADDRESS FIELD | | | | |
| RESERVED | | | | | MAC FRAME TYPE | | |
| PAGING SLOT NUM | | | | | PAGING CH NUM | | |
| CRC | | | | | | | |

A data frame of the channel request message is configured in an A type frame format, as seen from the above table 3.

The A type frame format is composed of a paging slot number region of high-order 4 bits of a 1 octet, and a paging channel number region of low-order 4 bits of the 1 octet, in addition to the regions in the A' type frame format shown in the table 1.

The channel request acknowledge message, channel response message and channel request message are configured in the different transmission frame formats as mentioned above. These messages commonly include a B type frame format shown in the below table 4.

TABLE 4

| 8 | 7 | 6 | 5 | 4 | 3 | 2 | 1 |
|---|---|---|---|---|---|---|---|
| | | | ADDRESS FIELD | | | | |
| RESERVED | | | | | MAC FRAME TYPE | | |

As seen from the above table 4, the B type frame format includes a 1-octet address field region, a reserved region of high-order 5 bits of a 1 octet, and a MAC frame type region of low-order 3 bits of the 1 octet.

The address field consists of a high-order 3-bit establishment cause and a low-order 5-bit random reference.

In this connection, as shown in FIG. 11, information elements, configured by the MAC for the message transmission, are a high-order 3-bit establishment cause, low-order 5-bit random reference, 4-bit paging slot number and 4-bit paging channel number.

The establishment cause represents a random access condition, and the random reference is a random number produced by the mobile terminal itself. The establishment cause and random reference are used to reduce the probabity that two mobile terminals will send messages with the same random number.

As shown in FIG. 12, the establishment cause indicates different random access conditions according to high-order 3 bits of a 1 octet. Namely, if the high-order 3 bits are "000", the establishment cause indicates a location updating condition. Also, the establishment cause represents an answer to paging condition if the high-order 3 bits are "001", a call originating condition if "010", a call reestablishment condition if "011", and an emergency call condition if "100".

The paging slot number is a value for identifying a specific slot to be monitored on a paging channel in a slot mode, and the paging channel number is a value for identifying a specific paging channel to be used in the slot mode or a non-slot mode.

The paging channel number identifies a specific paging channel to be used in the slot mode or non-slot mode. Namely, as shown in FIG. 13, if the low-order 4 bits are "0000", the paging channel number indicates a non-slot mode paging channel. If the low-order 4 bits are "0001" to "1111", the paging channel numbers indicate paging channels 1 to 15, respectively.

In this manner, each MAC of the mobile terminal and base station configures the information elements according to the message type so that a call service can be provided under a radio environment between the mobile terminal and the base station.

Figure 14:
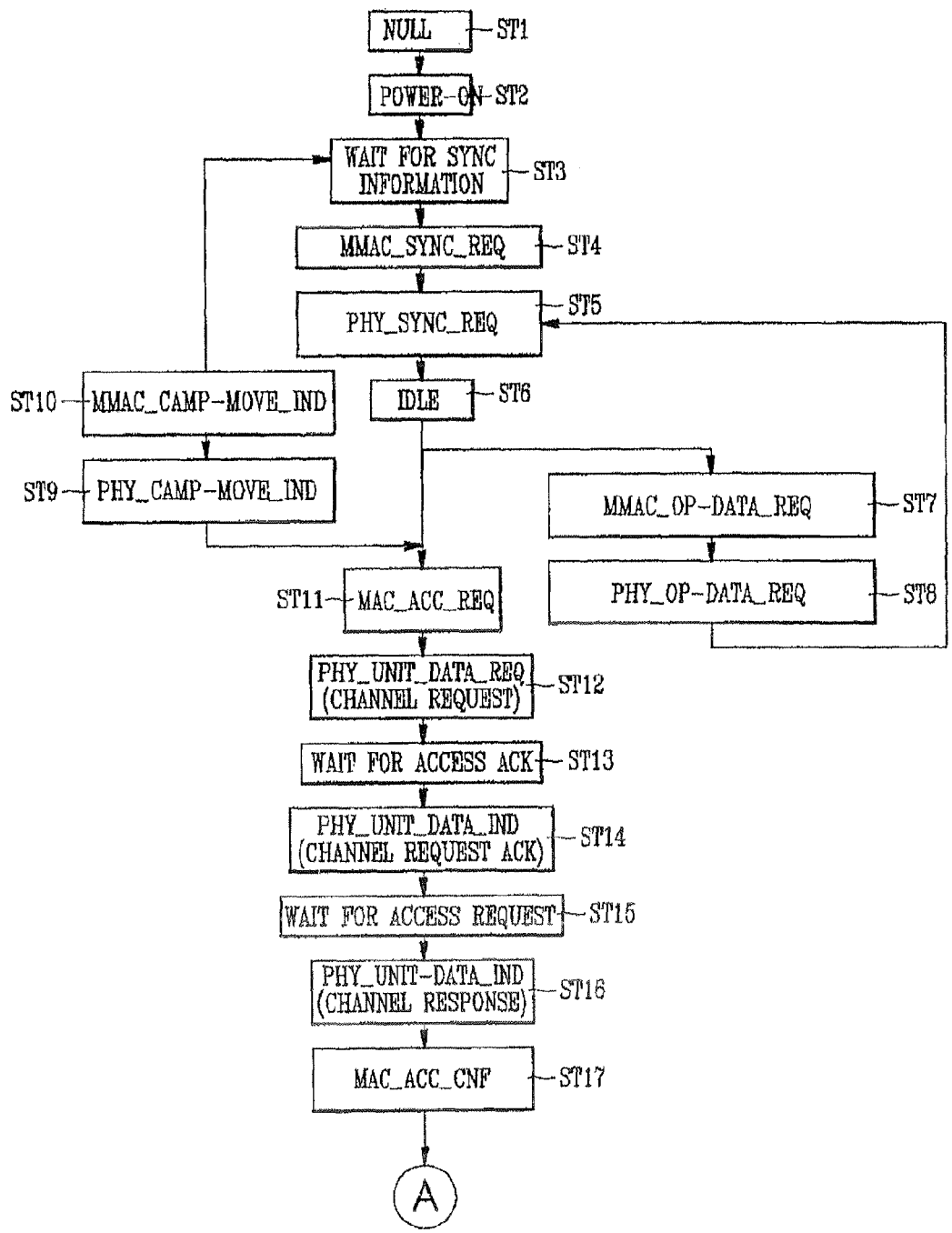
FIGS. 14 and 15 are flowcharts illustrating a method of operating a communication protocol between a base station and a mobile terminal using MAC sub-layers in a communication system in accordance with a fourth embodiment of the present invention.
Figure 14:
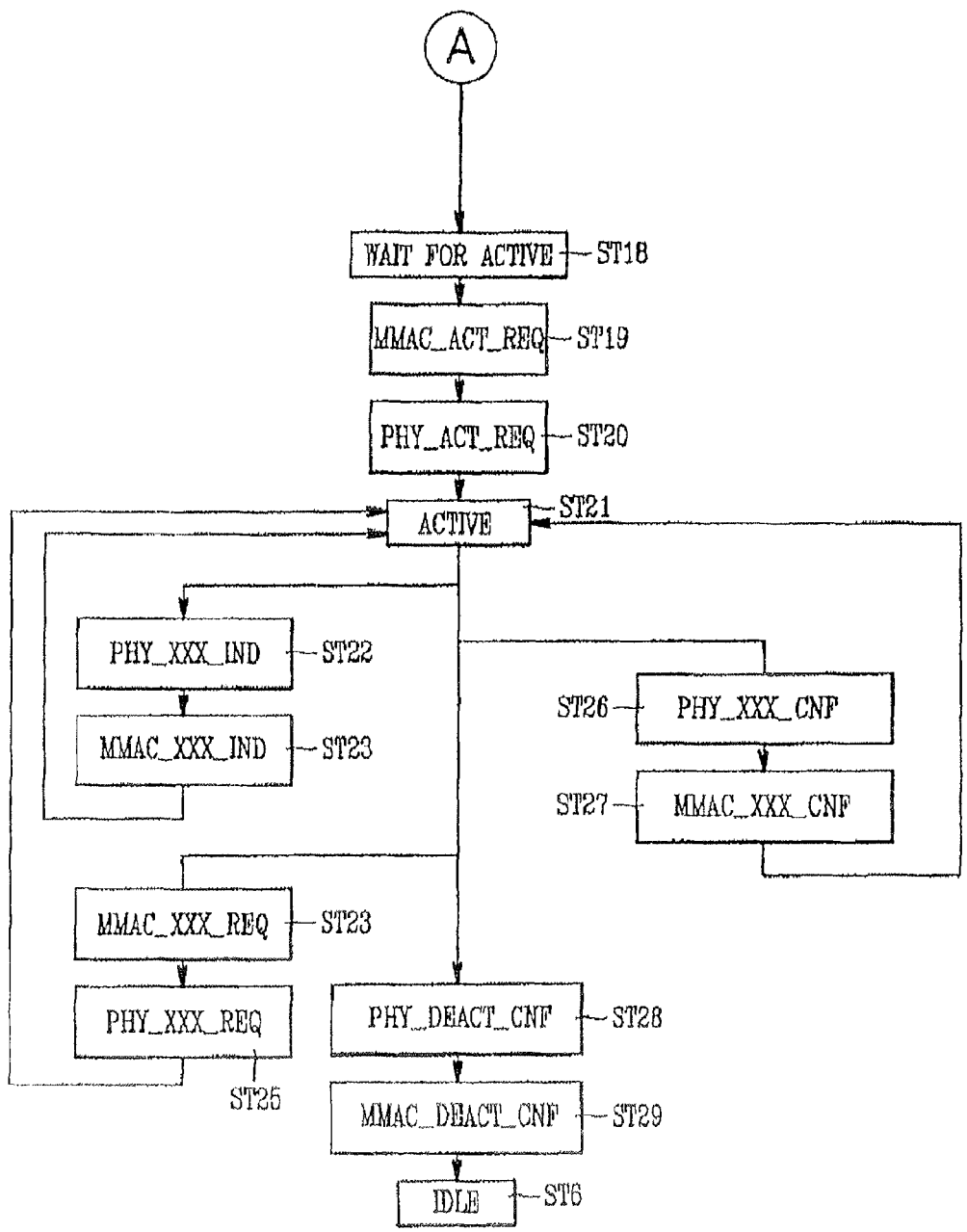
Figure 15:
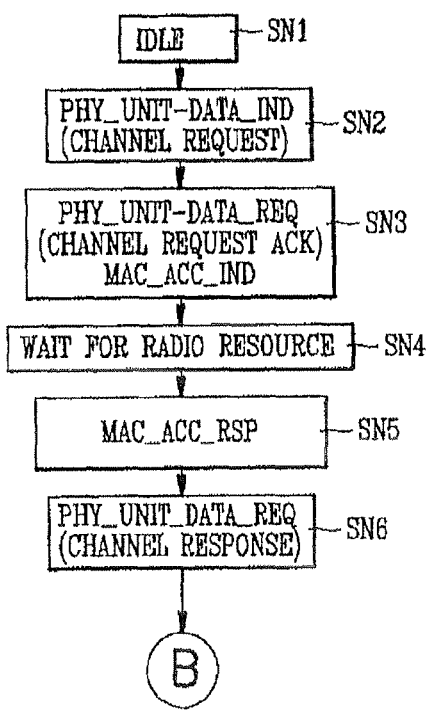
Figure 15:
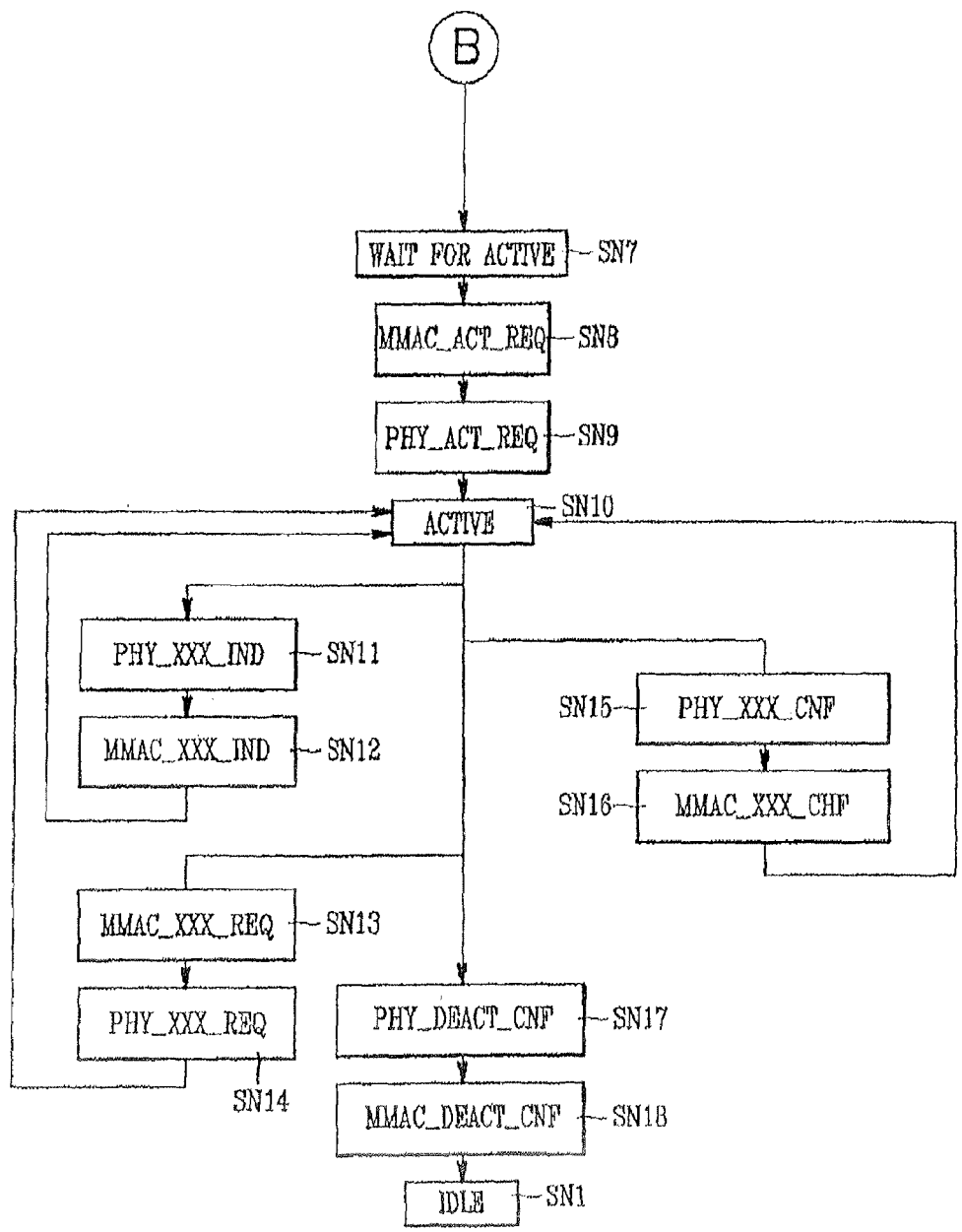

FIGS. 14 and 15 are flowcharts illustrating a method of operating a communication protocol between a base station and a mobile terminal using MAC sub-layers in a communication system in accordance with a fourth embodiment of the present invention.

In FIG. 14, a communication with the base station is disabled at a null step ST1. The reception of synchronization information is waited for at a wait for sync information step ST3. The setting of an SDCCH for originating and terminating of the mobile terminal is enabled at an idle step ST6. Random access is requested and acknowledgment thereof is waited for at a wait for access ACK step ST15. A response after the random access acknowledgment is waited for at a wait for access response step ST15. The activation of the SDCCH is waited for at a wait for active step ST18. The SDCCH or radio bearer is activated at an active step ST21 to enable information transfer therethrough.

In FIG. 15, the setting of an SDCCH for originating and terminating of the base station is enabled at an idle step SN1. A mobile terminal's request for the SDCCH setting is received and transferred to a LAC, and a response thereto is waited for at a wait for radio resource step SN4. The activation of the SDCCH is waited for at a wait for active step SN7. The SDCCH or radio bearer is activated at an active step SN10 to enable information transfer therethrough.

Each of the MAC sub-layers provided respectively in the mobile terminal and base station cooperates with upper layers (MM, RBC, RRC and LAC) and a lower layer (physical layer) to perform an initialization operation, idle mode operation and activation operation. The activation operation includes a radio resource allocation operation, radio resource activation mode operation and radio link failure processing operation.

Initialization Operation Between Mobile Terminal and Base Station

Upon power-on at step ST2, the MAC sub-layer of the mobile terminal proceeds from the null step ST1 to the wait for sync information step ST3. Then, the MAC sub-layer of the mobile terminal starts a predetermined timer and scans a synchronization channel (SCH) to obtain system time information and base station identification information for demodulation.

The MAC sub-layer of the mobile terminal determines whether a valid synchronization information message is received until the timer expires. If no valid synchronization information message is received, the MAC sub-layer of the mobile terminal transfers a synchronization acquisition failure cause in the form of a primitive MMAC_RADIO_FAIL_IND to the upper layer RRC and then proceeds to the idle step ST6.

In the case where the valid synchronization information message is received, the MAC sub-layer of the mobile terminal outputs a command to stop the timer and then transfers system time information and base station identification information included in the received synchronization information message in the form of a primitive PHY_SYNC_REQ to the physical layer at steps ST4 and ST5 to set a system time of the mobile terminal.

On the other hand, the initialization operation of the base station can be implemented in various manners according to development environments and a description thereof will thus be omitted. Noticeably, the base station must continuously broadcast synchronization information messages through the SCH at a desired period N1 (maximum 1 sec).

Idle Mode Operation Between Mobile Terminal and Base Station

First, the MAC sub-layer of the mobile terminal receives a system information message at an idle state and compares an identification number of the received system information with a system information identification number stored in the mobile terminal. If the identification number of the received system information is different from the system information identification number stored in the mobile terminal, the MAC sub-layer of the mobile terminal regards the received system information as newly modified system information and updates the current system information with the received system information. In this case, the MAC sub-layer of the mobile terminal must not communicate with the base station in any manner until the current system information is updated.

On the other hand, as shown in FIG. 15, the base station periodically broadcasts system information messages through a broadcasting control channel (BCCH) at the idle step SN1. At this time, a broadcasting period must be within N2 (maximum 1 sec). From a received system information message, the mobile terminal obtains information necessary to the connection to a base station being currently monitored. In this case, the system information message includes information regarding the current base station, access channel use control information, control information regarding an adjacent base station and CDMA channel list information.

Radio Resource Allocation Operation Between Mobile Terminal and Base Station

The radio resource allocation operation is performed for radio connection between the mobile terminal and the base station in response to a radio resource allocation request primitive MAC_ACC_REQ from the upper layer (LAC) of the MAC sub-layer. The primitive MAC_ACC_REQ is used in the MAC sub-layer to request the allocation of a radio resource (signal channel or traffic channel) to be used for registration of the position of an originating call. Here, the radio resource signifies a radio channel for a point-to-point service between the mobile terminal and the base station, which includes a signal channel (SDCCH) and traffic channel (TCH).

In the radio resource allocation operation of the mobile terminal, it is first checked whether the radio resource is authorized by the base station. Namely, a system information message broadcasted through the BCCH may include an access authorization level. If the radio resource is authorized by the base station, then the radio resource allocation operation of the mobile terminal is started. That is, as shown in FIG. 14, upon receiving a primitive MAC_ACC_REQ from the LAC at step ST11, the MAC sub-layer of the mobile terminal sends a channel request message to the base station at step ST12. The sending of the channel request message is performed by a random access operation. The power control of an access channel is performed by applying a command regarding a transmission power level to the physical layer according to the system information message broadcasted through the BCCH.

The random access operation can be performed in the following manner. That is, the mobile terminal tries the random access operation through the access channel to be allocated with a dedicated signal channel. Parameters used in the random access operation are an establishment cause which represents a random access condition, a random reference which is a random number produced by the mobile terminal itself, a paging channel number which identifies a paging channel, and a paging slot number which identifies a paging slot.

A confirm operation is performed after the radio resource allocation operation is completed. This confirm operation is required for the reliable exchange of messages between the mobile terminal and the base station. The mobile terminal sends a channel request message to the base station through the random access operation at step ST12. Then, upon receiving a channel response message from the base station at step ST16, the mobile terminal recognizes that the confirm operation has successfully been performed and then transfers a primitive MAC_ACC_CNF to the LAC at step ST17. The mobile terminal does not start a new access try until the current access try is completed.

If the radio resource is set by the channel response message being received by the mobile terminal, then the MAC sub-layer of the mobile terminal proceeds to the wait for active step ST18. Then, the upper layer (RRC) of the mobile terminal transfers a primitive MMAC_ACT_REQ to the MAC sub-layer at step ST19, and the MAC sub-layer transfers a primitive PHY_ACT_REQ to the physical layer at step ST20 to instruct it to activate the allocated radio resource. Then, upon receiving a response primitive PHY_ACT_CNF from the physical layer, the MAC sub-layer transfers a primitive MMAC_ACT_CNF to the RRC to inform it that the radio resource has been set.

On the other hand, the radio resource allocation operation of the base station is performed in the following manner.

Upon receiving the channel request message from the mobile terminal at step SN2, the MAC sub-layer of the base station sends a channel request acknowledge message to the mobile terminal at step SN3 to allow the mobile terminal to stop the random access try. Then, the base station allocates the radio resource requested by the mobile terminal thereto and then sends the channel response message to the mobile terminal at steps SN5 and SN6. The channel response message includes information associated with the radio resource allocation, or allocated frequency information and channel allocation description information.

The MAC sub-layer of the base station transfers information regarding the allocated radio resource to the physical layer to activate a physical channel at step SN8. Thereafter, signal processing procedures necessary to the connection control and call control are performed by a paging control operation. Here, because a point of radio resource activation time is a local factor, it may be set differently according to development environments.

If the radio resource is set, then the base station ends the radio resource allocation operation. The MAC sub-layer of the base station transfers a primitive PHY_ACT_REQ to the physical layer at step SN9 to request it to activate the allocated radio resource. Then, upon receiving a response from the physical layer, the MAC sub-layer of the base station transfers a primitive MMAC_ACT_CNF to the RRC of the base station at step SN16 to inform it that the radio resource has been set.

Radio Resource Activation Mode Operation Between Mobile Terminal and Base Station 1. Handover Trigger Operation In each of the mobile terminal and base station, the physical layer transfers a primitive PHY_HO_TRIGGER_IND to the MAC sub-layer to inform it that a handover operation must be performed. Then, the MAC sub-layer transfers a primitive MMAC_HO_TRIGGER_IND to the RRC.

2. Radio Condition Measurement Operation

The physical layer of the mobile terminal transfers a primitive PHY_MEASURE_IND to the MAC sub-layer to inform it that a cell condition or channel condition must be measured. Then, the MAC sub-layer transfers a primitive MMAC_MEASURE_IND to the RRC.

3. Cell Condition Measurement Request Operation

Upon receiving a cell condition report request from the base station, the RRC of the mobile terminal transfers a primitive MMAC_MEASURE_REQ to the MAC sub-layer. Then, the MAC sub-layer transfers a primitive PHY_MEASURE_REQ to the physical layer to request it to measure the cell condition. Then, the MAC sub-layer receives a response primitive PHY_MEASURE_CNF from the physical layer.

4. Channel Condition Measurement Request Operation

Upon receiving a channel condition report request from the base station, the RRC of the mobile terminal transfers a primitive MMAC_MEASURE_REQ to the MAC sub-layer. Then, the MAC sub-layer transfers a primitive PHY_MEASURE_REQ to the physical layer to request it to measure the channel condition. Then, the MAC sub-layer receives a response primitive PHY_MEASURE_CNF from the physical layer.

5. Cipher Request Operation

In each of the mobile terminal and base station, the MM transfers a primitive MMAC_CIPHER_REQ to the MAC sub-layer which then transfers a primitive PHY_CIPHER_REQ to the physical layer to request it to perform a cipher operation. Then, the MAC sub-layer receives a response primitive PHY_CIPHER_CNF from the physical layer.

6. Handover Processing Operation

In each of the mobile terminal and base station, the RBC transfers a primitive MMAC_HO_REQ to the MAC sub-layer which then transfers a primitive PHY_HO_REQ to the physical layer to request it to perform the handover operation. Then, the MAC sub-layer receives a response primitive PHY_HO_CNF from the physical layer.

7. Radio Resource Modification Operation

The radio resource modification operation is to modify attributes of a radio resource being used, according to a new service type (service, transmission rate, etc.).

If the MAC sub-layer receives a radio resource (signal channel and traffic channel) modification request primitive MMAC_MODIFY_REQ from the RBC, the mobile terminal and base station perform the following operations.

The radio resource is activated according to a new service included in the primitive MMAC_MODIFY_REQ.

The radio resource activation and deactivation operations are performed between the MAC sub-layer and physical layer of the mobile terminal on the basis of primitives PHY_MODIFY_REQ and PHY_MODIFY_CNF. The MAC sub-layer of the mobile terminal requests the physical layer to modify attributes of the radio resource. Then, the MAC sub-layer of the mobile terminal receives a response from the physical layer.

Here, because the radio resource activation and deactivation operations of the base station are local factors, they may be performed differently according to development environments.

8. Radio Link Failure Processing Operation

In each of the mobile terminal and base station, if a radio link fails before transition from the active state to a different state, the physical layer transfers a primitive PHY_RADIO_FAIL_IND to the MAC sub-layer which then transfers a primitive MMAC_RADIO_FAIL_IND to the RRC or RBC. As a result, the allocated radio resource is released and the operation then returns to the idle state.

As apparent from the above description, according to the present invention, the MAC sub-layer performs the basic functions such as the random access control information transfer function, control information transfer function, user information transfer function, framing/deframing functions, segmentation/reassembly functions, functions of dividing a LAC frame into physical channels and vice versa, CRC function, MAC sub-layer frame error detection function, and rate adaptation (padding) function of adjusting the number of bits suitably for a radio frame. Further, the MAC sub-layer performs the associated functions such as the synchronization information control function, system information control function, physical channel activation/deactivation functions, quality monitoring and reporting functions, and multi-bearer sequencing function of sequencing a multi-code.

Therefore, according to the present invention, the MAC sub-layer and the protocol operating method using the same can provide a compatible multimedia communication service even if an originating terminal and a terminating terminal employ different communication manners, they are available from different manufacturers or they are operated by different communication service operators.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for communicating condition information at a mobile terminal in a wireless communication system, the method comprising:
   receiving, in a lower entity of the mobile terminal, a measurement request message from a network, the measurement request message requesting the mobile terminal to perform a channel condition measurement, wherein the channel condition measurement comprises measuring an interference level;
   transmitting an indication message from the lower entity of the mobile terminal to an upper entity of the mobile terminal, the indication message indicating the received measurement request message requesting the mobile terminal to perform the channel condition measurement;
   receiving, in the lower entity of the mobile terminal, from the upper entity of the mobile terminal a request to perform the channel condition measurement;
   performing, at the lower entity of the mobile terminal, the channel condition measurement;
   transmitting, from the lower entity of the mobile terminal, to the upper entity of the mobile terminal a result of the channel condition measurement;
   receiving, in the lower entity of the mobile terminal, a measurement response from the upper entity of the mobile terminal requesting a transmission of a measurement response message; and
   transmitting, from the lower entity of the mobile terminal, the measurement response message to the network comprising information related to the channel condition measurement.

2. The method of claim 1, wherein the channel condition measurement comprises an error rate.

3. The method of claim 1, wherein the channel condition measurement comprises an interference level pilot signal.

4. The method of claim 1, wherein the measurement response is generated based on the result of the channel condition measurement.

5. The method of claim 1, wherein the measurement response message is generated based on the measurement response received from the upper entity of the mobile terminal.

6. A method for communicating condition information in a wireless communication system, the method comprising:
   receiving, in a lower entity of a network, a request message from an upper entity of the network, the request message requesting a channel condition measurement;
   transmitting a measurement request message from the lower entity of the network to a mobile terminal requesting the mobile terminal to perform the channel condition measurement, wherein the channel condition measurement comprises measuring an interference level;
   receiving, in the lower entity of the mobile terminal, the measurement request message from the network;
   transmitting an indication message from the lower entity of the mobile terminal to an upper entity of the mobile terminal, the indication message indicating the received measurement request message requesting the mobile terminal to perform the channel condition measurement;
   receiving, in the lower entity of the mobile terminal, from the upper entity of the mobile terminal a request to perform the channel condition measurement;
   performing the channel condition measurement at the mobile terminal;
   transmitting, from the lower entity of the mobile terminal, a measurement response message to the network comprising information related to the channel condition measurement; and
   receiving, in the lower entity of the network, the measurement response message from the mobile terminal.

7. The method of claim 6, further comprising receiving, in the lower entity of the mobile terminal, a measurement response from the upper entity of the mobile terminal prior to transmitting the measurement response message to the network, wherein the measurement response is generated based on a result of the channel condition measurement.

8. The method of claim 6, further comprising transmitting, from the lower entity of the network, an indication message to the upper entity of the network, the indication message indicating the measurement response message received in the lower entity of the network.

9. The method of claim 6, wherein the channel condition measurement comprises an error rate.

10. The method of claim 6, wherein the channel condition measurement comprises an interference level pilot signal.

* * * * *